United States Patent
Joo et al.

(10) Patent No.: US 12,522,665 B2
(45) Date of Patent: *Jan. 13, 2026

(54) METHODS AND SYSTEMS FOR TREATING OR PREVENTING PREGNANCY-RELATED HYPERTENSIVE DISORDERS

(71) Applicant: Aggamin, LLC, New York, NY (US)

(72) Inventors: Woo S. Joo, Gaithersburg, MD (US); Karen M. Lee, Massapequa, NY (US); Adelene Y. Tan, New York, NY (US); Garrett D. Daniels, Mamaroneck, NY (US); Paul Kussie, New York, NY (US)

(73) Assignee: AGGAMIN LLC, New York, NY (US)

( * ) Notice: Subject to any disclaimer, the term of this patent is extended or adjusted under 35 U.S.C. 154(b) by 847 days.

This patent is subject to a terminal disclaimer.

(21) Appl. No.: 17/783,783

(22) PCT Filed: Dec. 8, 2020

(86) PCT No.: PCT/US2020/063705
§ 371 (c)(1),
(2) Date: Jun. 9, 2022

(87) PCT Pub. No.: WO2021/118955
PCT Pub. Date: Jun. 17, 2021

(65) Prior Publication Data
US 2023/0030032 A1    Feb. 2, 2023

Related U.S. Application Data

(60) Provisional application No. 62/947,759, filed on Dec. 13, 2019.

(51) Int. Cl.
| | |
|---|---|
| C07K 16/28 | (2006.01) |
| A61P 9/14 | (2006.01) |
| G01N 33/68 | (2006.01) |
| C12N 15/85 | (2006.01) |

(52) U.S. Cl.
CPC ............ *C07K 16/2896* (2013.01); *A61P 9/14* (2018.01); *G01N 33/689* (2013.01); *C07K 2317/24* (2013.01); *C07K 2317/92* (2013.01); *C12N 2015/8518* (2013.01)

(58) Field of Classification Search
CPC ............ C07K 16/2896; C07K 2317/24; C07K 2317/92; A61P 9/14; A61P 9/00; G01N 33/689; C12N 2015/8518
See application file for complete search history.

(56) References Cited

U.S. PATENT DOCUMENTS

| | | |
|---|---|---|
| 2006/0067937 A1 * | 3/2006 | Karumanchi ...... C07K 16/2863 424/193.1 |
| 2009/0170767 A1 | 7/2009 | Karumanchi et al. |
| 2011/0076263 A1 | 3/2011 | Theuer et al. |
| 2011/0243956 A1 | 10/2011 | Karumanchi et al. |
| 2014/0234319 A1 | 8/2014 | Kapur et al. |
| 2014/0323708 A1 | 10/2014 | Toporsian |
| 2016/0208013 A1 | 7/2016 | Kapur et al. |

* cited by examiner

*Primary Examiner* — Nelson B Moseley, II
(74) *Attorney, Agent, or Firm* — Fox Rothschild LLP

(57) ABSTRACT

Disclosed are methods and apparatuses for treating a pregnancy related hypertensive disorder, such as pre-eclampsia and eclampsia, using ex vivo treatment with an anti-sEng antibody bound to a solid support in order to reduce blood levels of sEng. The present invention provides a method of treating or preventing a disorder associated with soluble Endoglin (sEng), such as a pregnancy-related hypertensive disorder, in a subject in need thereof comprising providing ex vivo to the subject anti-sEng antibodies or sEng-binding fragments thereof in an amount sufficient and for a time sufficient to decrease the subject's blood levels of sEng to treat or prevent the disorder associated with sEng in the subject.

17 Claims, 8 Drawing Sheets
Specification includes a Sequence Listing.

Fig. 3A

Binding of antibodies to ZP domain of sEng

Fig. 3B

Binding of antibodies to orphan domain of sEng

SEQUENCE LISTING

```
<160> NUMBER OF SEQ ID NOS: 14

<210> SEQ ID NO 1
<211> LENGTH: 360
<212> TYPE: DNA
<213> ORGANISM: Artificial Sequence
<220> FEATURE:
<223> OTHER INFORMATION: Nucleotide sequence of MAb 210 and chimeric
      anti-sEng antibody cENG10 variable domain of heavy chain (VH)
      (without leader sequence)

<400> SEQUENCE: 1
gaggtccagc tggaacagtc tggacctgaa gtggtgaagc ctgggacttc agtgaagata      60
tcctgcaaga cttctggata cacaatcact gaacacacct tgcactggat aaagcagaac     120
cagggaaaga gccttgagtg gattggtggt attaattttg acaatggtgg tactacctac     180
aggcagaaat tcaaggacaa ggccacattg actgtggaca gtcctccag cacagccttc      240 atggagctcc gcagcctgac ttctgatgat tctgcagtct atttctgcgc aagaagggcc     300
tattactacg gtagtgcctt tgactactgg ggccaaggca ccactctcac agtctcctca     360

<210> SEQ ID NO 2
<211> LENGTH: 120
<212> TYPE: PRT
<213> ORGANISM: Artificial Sequence
<220> FEATURE:
<223> OTHER INFORMATION: Amino acid sequence of MAb 210 and chimeric
      anti-sEng antibody cENG10 variable domain of heavy chain (VH)
      (without leader sequence)

<400> SEQUENCE: 2

Glu Val Gln Leu Glu Gln Ser Gly Pro Glu Val Val Lys Pro Gly Thr
1               5                   10                  15
```

-continued

```
Ser Val Lys Ile Ser Cys Lys Thr Ser Gly Tyr Thr Ile Thr Glu His
             20                  25                  30

Thr Leu His Trp Ile Lys Gln Asn Gln Gly Lys Ser Leu Glu Trp Ile
         35                  40                  45

Gly Gly Ile Asn Phe Asp Asn Gly Gly Thr Thr Tyr Arg Gln Lys Phe
 50                  55                  60

Lys Asp Lys Ala Thr Leu Thr Val Asp Lys Ser Ser Thr Ala Phe
65                   70                  75                  80

Met Glu Leu Arg Ser Leu Thr Ser Asp Asp Ser Ala Val Tyr Phe Cys
                 85                  90                  95

Ala Arg Arg Ala Tyr Tyr Gly Ser Ala Phe Asp Tyr Trp Gly Gln
             100                 105                 110

Gly Thr Thr Leu Thr Val Ser Ser
         115                 120
```

<210> SEQ ID NO 3
<211> LENGTH: 318
<212> TYPE: DNA
<213> ORGANISM: Artificial Sequence
<220> FEATURE:
<223> OTHER INFORMATION: Nucleotide sequence of MAb 210 and chimeric
      anti-sEng antibody cENG10 variable domain of light chain (VL)
      (without leader sequence)

<400> SEQUENCE: 3

```
gaaaatgtgc tcacccagtc tccagcaatc atgtctgcat ctctagggga gaaggtcacc      60
atgacctgca gggccagctc aagtgtgaat tacgtgtact ggtaccagca gaagtcagat     120
gcctccccca aactatggat ttattacact tccaacctgg ctcctggagt cccagctcgc     180
ttcagtggca gtgggtctgg gaactcttat tctctcacaa tcagcagcat ggagggtgaa     240
gatgctgcca cttattactg ccagcagttt attagtttcc catacacgtt cggaggggggg    300 accaagctgg aaataaaa                                                   318
```

<210> SEQ ID NO 4
<211> LENGTH: 106
<212> TYPE: PRT
<213> ORGANISM: Artificial Sequence
<220> FEATURE:
<223> OTHER INFORMATION: Amino acid sequence of MAb 210 and chimeric
      anti-sEng antibody cENG10 variable domain of heavy chain (VL)
      (without leader sequence)

<400> SEQUENCE: 4

```
Glu Asn Val Leu Thr Gln Ser Pro Ala Ile Met Ser Ala Ser Leu Gly
1               5                   10                  15

Glu Lys Val Thr Met Thr Cys Arg Ala Ser Ser Ser Val Asn Tyr Val
             20                  25                  30

Tyr Trp Tyr Gln Gln Lys Ser Asp Ala Ser Pro Lys Leu Trp Ile Tyr
         35                  40                  45

Tyr Thr Ser Asn Leu Ala Pro Gly Val Pro Ala Arg Phe Ser Gly Ser
     50                  55                  60

Gly Ser Gly Asn Ser Tyr Ser Leu Thr Ile Ser Ser Met Glu Gly Glu
65                  70                  75                  80

Asp Ala Ala Thr Tyr Tyr Cys Gln Gln Phe Ile Ser Phe Pro Tyr Thr
                 85                  90                  95

Phe Gly Gly Gly Thr Lys Leu Glu Ile Lys
            100                 105
```

```
<210> SEQ ID NO 5
<211> LENGTH: 10
<212> TYPE: PRT
<213> ORGANISM: Artificial Sequence
<220> FEATURE:
<223> OTHER INFORMATION: CDR1H

<400> SEQUENCE: 5

Gly Tyr Thr Ile Thr Glu His Thr Leu His
1               5                   10

<210> SEQ ID NO 6
<211> LENGTH: 17
<212> TYPE: PRT
<213> ORGANISM: Artificial Sequence
<220> FEATURE:
<223> OTHER INFORMATION: CDR2H

<400> SEQUENCE: 6

Gly Ile Asn Phe Asp Asn Gly Gly Thr Thr Tyr Arg Gln Lys Phe Lys
1               5                   10                  15

Asp

<210> SEQ ID NO 7
<211> LENGTH: 11
<212> TYPE: PRT
<213> ORGANISM: Artificial Sequence
<220> FEATURE:
<223> OTHER INFORMATION: CDR3H

<400> SEQUENCE: 7

Arg Ala Tyr Tyr Tyr Gly Ser Ala Phe Asp Tyr
1               5                   10

<210> SEQ ID NO 8
<211> LENGTH: 10
<212> TYPE: PRT
<213> ORGANISM: Artificial Sequence
<220> FEATURE:
<223> OTHER INFORMATION: CDR1L

<400> SEQUENCE: 8

Arg Ala Ser Ser Ser Val Asn Tyr Val Tyr
1               5                   10

<210> SEQ ID NO 9
<211> LENGTH: 7
<212> TYPE: PRT
<213> ORGANISM: Artificial Sequence
<220> FEATURE:
<223> OTHER INFORMATION: CDR2L

<400> SEQUENCE: 9

Tyr Thr Ser Asn Leu Ala Pro
1               5

<210> SEQ ID NO 10
<211> LENGTH: 9
<212> TYPE: PRT
<213> ORGANISM: Artificial Sequence
<220> FEATURE:
<223> OTHER INFORMATION: CDR3L

<400> SEQUENCE: 10

Gln Gln Phe Ile Ser Phe Pro Tyr Thr
1               5
```

<210> SEQ ID NO 11
<211> LENGTH: 1407
<212> TYPE: DNA
<213> ORGANISM: Artificial Sequence
<220> FEATURE:
<223> OTHER INFORMATION: Nucleotide sequence of chimeric anti-sEng
       antibody cENG10 heavy chain
<220> FEATURE:
<221> NAME/KEY: sig_peptide
<222> LOCATION: (1)..(57)

<400> SEQUENCE: 11

```
atgggatggt catgtatcat ccttttcta gtagcaactg caactggagt acattcagag      60
gtccagctgg aacagtctgg acctgaagtg gtgaagcctg gacttcagt gaagatatcc     120 tgcaagactt ctggatacac aatcactgaa cacaccttgc actggataaa gcagaaccag    180
ggaaagagcc ttgagtggat tggtggtatt aatttgaca atggtggtac tacctacagg     240
cagaaattca aggacaaggc acattgact gtggacaagt cctccagcac agccttcatg     300
gagctccgca gcctgacttc tgatgattct gcagtctatt tctgcgcaag aagggcctat    360
tactacggta gtgcctttga ctactgggc caaggcacca ctctcacagt ctcctcagct     420
agcaccaagg gcccatcggt cttccccctg gcaccctcct ccaagagcac ctctggggc     480 acagcggccc tgggctgcct ggtcaaggac tacttcccg aaccggtgac ggtgtcgtgg     540
aactcaggcg ccctgaccag cggcgtgcac accttcccgg ctgtcctaca gtcctcagga    600
ctctactccc tcagcagcgt ggtgaccgtg ccctccagca gcttgggcac ccagacctac    660
atctgcaacg tgaatcacaa gcccagcaac accaaggtgg acaagagagt tgagcccaaa    720
tcttgtgaca aaactcacac atgcccaccg tgcccagcac ctgaactcct ggggggaccg    780
tcagtcttcc tcttcccccc aaaacccaag gacaccctca tgatctcccg gacccctgag    840
gtcacatgcg tggtggtgga cgtgagccac gaagaccctg aggtcaagtt caactggtat    900
gtggacggcg tggaggtgca taatgccaag acaaagccgc gggaggagca gtaccaaagc    960
acgtaccgtg tggtcagcgt cctcaccgtc ctgcaccaag actggctgaa tggcaaggag   1020
tacaagtgca aggtctccaa caaagccctc ccagccccca tcgagaaaac catctccaaa   1080
gccaaagggc agccccgaga accacaggtg tacaccctgc ccccatcccg ggaggagatg   1140
accaagaacc aagtcagcct gacctgcctg gtcaaaggct tctatcccag cgacatcgcc   1200
gtggagtggg agagcaatgg gcagccggag aacaactaca agaccacgcc tcccgtgctg   1260
gactccgacg gctccttctt cctctattcc aagctcaccg tggacaagag caggtggcag   1320
caggggaacg tcttctcatg ctccgtgatg catgaggctc tgcacaacca ctacacgcag   1380
aagagcctct ccctgtctcc gggctga                                      1407
```

<210> SEQ ID NO 12
<211> LENGTH: 449
<212> TYPE: PRT
<213> ORGANISM: Artificial Sequence
<220> FEATURE:
<223> OTHER INFORMATION: Amino acid sequence of chimeric anti-sEng
       antibody cENG10 heavy chain

<400> SEQUENCE: 12

Glu Val Gln Leu Glu Gln Ser Gly Pro Glu Val Val Lys Pro Gly Thr
1               5                   10                  15

Ser Val Lys Ile Ser Cys Lys Thr Ser Gly Tyr Thr Ile Thr Glu His
            20                  25                  30

-continued

```
Thr Leu His Trp Ile Lys Gln Asn Gln Gly Lys Ser Leu Glu Trp Ile
         35                  40                  45

Gly Gly Ile Asn Phe Asp Asn Gly Gly Thr Thr Tyr Arg Gln Lys Phe
         50                  55                  60

Lys Asp Lys Ala Thr Leu Thr Val Asp Lys Ser Ser Ser Thr Ala Phe
 65                  70                  75                  80

Met Glu Leu Arg Ser Leu Thr Ser Asp Ser Ala Val Tyr Phe Cys
                     85                  90                  95

Ala Arg Arg Ala Tyr Tyr Gly Ser Ala Phe Asp Tyr Trp Gly Gln
                    100                 105                 110

Gly Thr Thr Leu Thr Val Ser Ser Ala Ser Thr Lys Gly Pro Ser Val
                    115                 120                 125

Phe Pro Leu Ala Pro Ser Ser Lys Ser Thr Ser Gly Gly Thr Ala Ala
                    130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                    165                 170                 175

Leu Gln Ser Ser Gly Leu Tyr Ser Leu Ser Ser Val Val Thr Val Pro
                    180                 185                 190

Ser Ser Ser Leu Gly Thr Gln Thr Tyr Ile Cys Asn Val Asn His Lys
                    195                 200                 205

Pro Ser Asn Thr Lys Val Asp Lys Arg Val Glu Pro Lys Ser Cys Asp
                    210                 215                 220

Lys Thr His Thr Cys Pro Pro Cys Pro Ala Pro Glu Leu Leu Gly Gly
225                 230                 235                 240

Pro Ser Val Phe Leu Phe Pro Pro Lys Pro Lys Asp Thr Leu Met Ile
                    245                 250                 255

Ser Arg Thr Pro Glu Val Thr Cys Val Val Val Asp Val Ser His Glu
                    260                 265                 270

Asp Pro Glu Val Lys Phe Asn Trp Tyr Val Asp Gly Val Glu Val His
                    275                 280                 285

Asn Ala Lys Thr Lys Pro Arg Glu Glu Gln Tyr Gln Ser Thr Tyr Arg
                    290                 295                 300

Val Val Ser Val Leu Thr Val Leu His Gln Asp Trp Leu Asn Gly Lys
305                 310                 315                 320

Glu Tyr Lys Cys Lys Val Ser Asn Lys Ala Leu Pro Ala Pro Ile Glu
                    325                 330                 335

Lys Thr Ile Ser Lys Ala Lys Gly Gln Pro Arg Glu Pro Gln Val Tyr
                    340                 345                 350

Thr Leu Pro Pro Ser Arg Glu Glu Met Thr Lys Asn Gln Val Ser Leu
                    355                 360                 365

Thr Cys Leu Val Lys Gly Phe Tyr Pro Ser Asp Ile Ala Val Glu Trp
                    370                 375                 380

Glu Ser Asn Gly Gln Pro Glu Asn Asn Tyr Lys Thr Thr Pro Pro Val
385                 390                 395                 400

Leu Asp Ser Asp Gly Ser Phe Phe Leu Tyr Ser Lys Leu Thr Val Asp
                    405                 410                 415

Lys Ser Arg Trp Gln Gln Gly Asn Val Phe Ser Cys Ser Val Met His
                    420                 425                 430

Glu Ala Leu His Asn His Tyr Thr Gln Lys Ser Leu Ser Leu Ser Pro
                    435                 440                 445
```

Gly

<210> SEQ ID NO 13
<211> LENGTH: 699
<212> TYPE: DNA
<213> ORGANISM: Artificial Sequence
<220> FEATURE:
<223> OTHER INFORMATION: Nucleotide sequence of chimeric anti-sEng
      antibody cENG10 light chain
<220> FEATURE:
<221> NAME/KEY: sig_peptide
<222> LOCATION: (1)..(57)

<400> SEQUENCE: 13

```
atgggatggt catgtatcat ccttttctta gtagcaactg caactggagt acattcagaa      60
aatgtgctca cccagtctcc agcaatcatg tctgcatctc tagggagaa ggtcaccatg      120 acctgcaggg ccagctcaag tgtgaattac gtgtactggt accagcagaa gtcagatgcc      180
tcccccaaac tatggattta ttacacttcc aacctggctc ctggagtccc agctcgcttc      240
agtggcagtg ggtctgggaa ctcttattct ctcacaatca gcagcatgga gggtgaagat      300
gctgccactt attactgcca gcagtttatt agtttcccat acacgttcgg agggggacc      360 aagctggaaa taaaacggac tgtggctgca ccatctgtct tcatcttccc gccatctgat      420
gagcagttga aatctggaac tgcctctgtt gtgtgcctgc tgaataactt ctatcccaga      480
gaggccaaag tacagtggaa ggtggataac gccctccaat cgggtaactc ccaggagagt      540
gtcacagagc aggacagcaa ggacagcacc tacagcctca gcagcaccct gacgctgagc      600
aaagcagact acgagaaaca caaagtctac gcctgcgaag tcacccatca gggcctgagc      660
tcgcccgtca caaagagctt caacagggga gagtgttag                             699
```

<210> SEQ ID NO 14
<211> LENGTH: 213
<212> TYPE: PRT
<213> ORGANISM: Artificial Sequence
<220> FEATURE:
<223> OTHER INFORMATION: Amino acid sequence of chimeric anti-sEng
      antibody cENG10 light chain

<400> SEQUENCE: 14

Glu Asn Val Leu Thr Gln Ser Pro Ala Ile Met Ser Ala Ser Leu Gly
1               5                   10                  15

Glu Lys Val Thr Met Thr Cys Arg Ala Ser Ser Ser Val Asn Tyr Val
            20                  25                  30

Tyr Trp Tyr Gln Gln Lys Ser Asp Ala Ser Pro Lys Leu Trp Ile Tyr
        35                  40                  45

Tyr Thr Ser Asn Leu Ala Pro Gly Val Pro Ala Arg Phe Ser Gly Ser
    50                  55                  60

Gly Ser Gly Asn Ser Tyr Ser Leu Thr Ile Ser Ser Met Glu Gly Glu
65                  70                  75                  80

Asp Ala Ala Thr Tyr Tyr Cys Gln Gln Phe Ile Ser Phe Pro Tyr Thr
                85                  90                  95

Phe Gly Gly Gly Thr Lys Leu Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu

-continued

```
                145                 150                 155                 160

Ser Val Thr Glu Gln Asp Ser Lys Asp Ser Thr Tyr Ser Leu Ser Ser
                        165                 170                 175

Thr Leu Thr Leu Ser Lys Ala Asp Tyr Glu Lys His Lys Val Tyr Ala
                        180                 185                 190

Cys Glu Val Thr His Gln Gly Leu Ser Ser Pro Val Thr Lys Ser Phe
                    195                 200                 205

Asn Arg Gly Glu Cys
            210
```

METHODS AND SYSTEMS FOR TREATING OR PREVENTING PREGNANCY-RELATED HYPERTENSIVE DISORDERS

STATEMENT REGARDING FEDERALLY SPONSORED RESEARCH OR DEVELOPMENT

This invention was made with government support under grant number R44 HD 075571 awarded by National Institute of Child Health and Human Development (NICHD). The government has certain rights in the invention.

FIELD OF THE INVENTION

The present disclosure relates to methods, systems, devices, and apparatuses for treating pregnancy-related hypertensive disorders such as pre-eclampsia and eclampsia.

BACKGROUND

Pre-eclampsia is a syndrome of hypertension, edema, and proteinuria that affects 5 to 10% of pregnancies and results in substantial maternal and fetal morbidity and mortality. Pre-eclampsia accounts for at least 63,000 maternal deaths worldwide per year. The symptoms of pre-eclampsia typically appear after the 20th week of pregnancy and are usually detected by the routine monitoring of blood pressure and protein levels in urine. However, these monitoring methods are ineffective for diagnosis of pre-eclampsia at an early stage, which could reduce the risk to the subject or developing fetus, if an effective treatment were available.

Symptoms of pre-eclampsia generally include any of the following: (1) a systolic blood pressure (BP)>140 mmHg and a diastolic BP>90 mmHg after 20 weeks gestation, (2) new onset proteinuria (1+ by dipstick on urinalysis, >300 mg of protein in a 24 hour urine collection, or random urine protein/creatinine ratio>0.3), or (3) new-onset hypertension with new-onset of any of the following: thrombocytopenia, renal insufficiency, impaired liver function, pulmonary edema, cerebral/visual symptoms. The symptoms of pre-eclampsia can also include renal dysfunction and glomerular endotheliosis or hypertrophy. Other symptoms of eclampsia may be any of the following symptoms due to pregnancy or the influence of a recent pregnancy: seizures, coma, thrombocytopenia, liver edema, pulmonary edema, or cerebral edema. Women with pre-eclampsia are further at risk of developing HELLP syndrome, which is characterized by hemolysis (H, the breakdown of red blood cells), elevated liver enzymes (EL), and low platelet count (LP).

Pre-eclampsia can vary in severity from mild to life threatening. A mild form of pre-eclampsia may be treated with bed rest and frequent monitoring. For moderate to severe cases, hospitalization is recommended and blood pressure medications or anticonvulsant medications to prevent seizures are prescribed. If the condition becomes life threatening to the mother or the fetus, the pregnancy is terminated and the fetus is delivered pre-term.

Currently, the availability of effective therapies for pre-eclampsia or eclampsia is severely limited. Premature delivery saves the mother but poses significant risks to newborns. The current standard of care is to monitor and to manage maternal symptoms. Magnesium sulfate is given to prevent seizure. Antihypertensives such as hydralazine, nicardipine, nifedipine, and β-blockers are used as emergency treatment in severe cases, but using these drugs can cause hypotension and other side effects. These small-molecule compounds can cross the placental barrier and pose direct risks to the fetus. Importantly, none of these drugs target the underlying causes of pre-eclampsia. Given the limited effectiveness of the current standard of care for pregnancy-related hypertensive disorder, additional therapies that target pre-eclampsia-specific pathological factors, relieve maternal symptoms, and safely prolong pregnancy are urgently needed.

SUMMARY OF THE INVENTION

The present invention provides a method of treating or preventing a disorder associated with soluble Endoglin (sEng), such as a pregnancy-related hypertensive disorder, in a subject in need thereof comprising providing ex vivo to the subject anti-sEng antibodies or sEng-binding fragments thereof in an amount sufficient and for a time sufficient to decrease the subject's blood levels of sEng to treat or prevent the disorder associated with sEng in the subject.

In certain embodiments, the method comprises removing a volume of the subject's blood, bringing the blood or a component thereof (e.g., plasma) into contact with the anti-sEng antibodies or sEng-binding fragments thereof, where the anti-sEng antibodies or sEng-binding fragments thereof are bound to a solid support, to bind sEng in the subject's blood or component thereof to the anti-sEng antibodies or sEng-binding fragments thereof, thereby decreasing the amount of sEng in the subject's blood or component thereof, and returning the blood or component thereof to the subject.

In one aspect, provided are anti-sEng antibodies or sEng-binding fragments thereof. The antibodies can be used in the aforementioned ex vivo methods, and can also be administered to a subject. In certain embodiments, the anti-sEng antibodies or sEng-binding fragments thereof, comprise one, two, or three heavy chain CDRs having SEQ ID NO:5, SEQ ID NO:6, and/or SEQ ID NO:7 and/or one, two, or three light chain CDRs having SEQ ID NO:8, SEQ ID NO:9, and/or SEQ ID NO:10. In certain embodiments, anti-sEng antibodies or sEng-binding fragments thereof comprise one, two, or three heavy chain CDRs having substantially the same sequence as SEQ ID NO:5, SEQ ID NO:6, and/or SEQ ID NO:7 and/or one, two, or three light chain CDRs having substantially the same sequence as SEQ ID NO:8 SEQ ID NO:9, and/or SEQ ID NO:10. In certain embodiments, the anti-sEng antibodies or sEng-binding fragments thereof comprise a CDR1H comprising SEQ ID NO:5, a CDR2H comprising SEQ ID NO:6, a CDR3H comprising SEQ ID NO:7, a CDR1L comprising SEQ ID NO:8, a CDR2L comprising SEQ ID NO:9, and a CDR3L comprising SEQ ID NO:10. In one embodiment, the heavy chain variable region of the anti-sEng antibody or sEng-binding fragment thereof comprises SEQ ID NO:2 or a sequence at least 85% identical thereto and/or the light chain variable region of the anti-sEng antibody or sEng-binding fragment thereof comprises SEQ ID NO:4 or a sequence at least 85% identical thereto. In one embodiment, the anti-sEng antibody or sEng-binding fragment thereof has a heavy chain comprising SEQ ID NO:12 or a sequence at least 85% identical thereto and/or the anti-sEng antibody or sEng-binding fragment thereof has a light chain comprising SEQ ID NO:14 or a sequence at least 85% identical thereto.

In one aspect, the anti-sEng antibodies or sEng-binding fragments thereof do not block ligand binding to sEng. sEng ligands include BMP9, BMP10, TGF-β1, and/or TGF-β3. In certain embodiments, the anti-sEng antibodies or sEng-binding fragments thereof bind to an epitope in sEng that is not present in membrane-bound Endoglin (Eng). In certain embodiments of the invention, the anti-sEng antibodies or sEng-binding fragments thereof bind to the orphan domain of human sEng.

It is observed that the ability of an antibody to deplete sEng from blood or a component thereof is not necessarily dependent on binding affinity, and may be influenced by the region of sEng to which the antibody binds. In certain embodiments, the anti-sEng antibodies or sEng-binding fragments thereof compete for binding with an antibody comprising one, two, or three heavy chain CDRs having SEQ ID NO:5, SEQ ID NO:6, and/or SEQ ID NO:7 and/or one, two, or three light chain CDRs having SEQ ID NO:8, SEQ ID NO:9, and/or SEQ ID NO:10. In certain embodiments, anti-sEng antibodies or sEng-binding fragments thereof compete with an antibody comprising one, two, or three heavy chain CDRs having substantially the same sequence as SEQ ID NO:5, SEQ ID NO:6, and/or SEQ ID NO:7 and/or one, two, or three light chain CDRs having substantially the same sequence as SEQ ID NO:8 SEQ ID NO:9, and/or SEQ ID NO:10. In certain embodiments, the anti-sEng antibodies or sEng-binding fragments thereof compete with an antibody comprising a CDR1H comprising SEQ ID NO:5, a CDR2H comprising SEQ ID NO:6, a CDR3H comprising SEQ ID NO:7, a CDR1L comprising SEQ ID NO:8, a CDR2L comprising SEQ ID NO:9, and a CDR3L comprising SEQ ID NO:10. In one embodiment, the anti-sEng antibody or sEng-binding fragment thereof competes with an antibody comprising a heavy chain variable region comprising SEQ ID NO:2 or a sequence at least 85% identical thereto and/or comprising a light chain variable region comprising SEQ ID NO:4 or a sequence at least 85% identical thereto. In one embodiment, the anti-sEng antibody or sEng-binding fragment thereof competes with an antibody comprising a heavy chain comprising SEQ ID NO:12 or a sequence at least 85% identical thereto and/or comprising a light chain comprising SEQ ID NO:14 or a sequence at least 85% identical thereto.

In certain embodiments provided are methods of treating and/or preventing a sEng-related disorder, wherein the sEng-related disorder is a pregnancy-related hypertensive disorder. In some embodiments, the pregnancy-related hypertensive disorder is eclampsia, pre-eclampsia, HELLP syndrome, or postpartum hypertension. In certain embodiments, the pregnancy-related hypertensive disorder is pre-eclampsia. In certain embodiments, the pregnancy-related hypertensive disorder is HELLP syndrome.

In certain embodiments, provided are methods of treating and/or preventing a sEng-related disorder, wherein the sEng-related disorder is a non-hypertensive sEng-related disorder. In some embodiments, the non-hypertensive sEng-related disorder is chronic kidney disease, systemic sclerosis (scleroderma), or a non-hypertensive sEng-related disorder of late stage pregnancy and labor. In one embodiment, the non-hypertensive sEng-related disorder of late stage pregnancy and labor is pre-term labor.

In certain embodiments, the subject is a pregnant human, a postpartum human, or a non-human (e.g., a cow, a horse, a sheep, a pig, a goat, a dog, or a cat). In certain embodiments, the subject is a pregnant human or a postpartum human. In certain embodiments, the subject is a pregnant human.

In one embodiment, provided is a nucleic acid encoding an anti-sEng antibody or sEng-binding fragment disclosed herein. In one embodiment, the nucleic acid encodes a variable chain sequence comprising SEQ ID NO:2 and/or SEQ ID NO:4. In some embodiments, the nucleic acid comprises SEQ ID NO:1 or SEQ ID NO:3. In one embodiment, provided is a vector comprising a nucleic acid disclosed herein and a cell comprising such vector.

In one aspect, provided is a method of treating or preventing an sEng-related disorder, such as a pregnancy-related hypertensive disorder, in a subject in need thereof, the method comprising providing ex vivo to the subject an anti-sEng antibody or sEng-binding fragment thereof comprising one, two, or three heavy chain CDRs having SEQ ID NO:5, SEQ ID NO:6, and/or SEQ ID NO:7 and/or one, two, or three light chain CDRs having SEQ ID NO:8, SEQ ID NO:9, and/or SEQ ID NO:10. In one aspect, provided is a method of treating or preventing an sEng-related disorder, such as a pregnancy-related hypertensive disorder, in a subject in need thereof, the method comprising providing ex vivo to the subject an anti-sEng antibody or sEng-binding fragment thereof, antibody comprising one, two, or three heavy chain CDRs having substantially the same sequence as SEQ ID NO:5, SEQ ID NO:6, and/or SEQ ID NO:7 and/or one, two, or three light chain CDRs having substantially the same sequence as SEQ ID NO:8 SEQ ID NO:9, and/or SEQ ID NO:10. In one aspect, provided is a method of treating or preventing an sEng-related disorder, such as a pregnancy-related hypertensive disorder, in a subject in need thereof, the method comprising providing ex vivo to the subject an anti-sEng antibody or sEng-binding fragment thereof, the anti-sEng antibody or sEng-binding fragment comprising a heavy chain variable region and a light chain variable region, wherein each of the heavy chain and the light chain variable regions comprises a CDR1, CDR2, and CDR3, and wherein the sequence of CDR1H comprises SEQ ID NO:5, the sequence of CDR2H comprises SEQ ID NO:6, the sequence of CDR3H comprises SEQ ID NO:7, the sequence of CDR1L comprises SEQ ID NO:8, the sequence of CDR2L comprises SEQ ID NO:9, and the sequence of CDR3L comprises SEQ ID NO:10. In one embodiment, the heavy chain variable region of the anti-sEng antibody or sEng-binding fragment thereof comprises SEQ ID NO:2 or a sequence at least 85% identical thereto and/or the light chain variable region of the anti-sEng antibody or sEng-binding fragment thereof comprises SEQ ID NO:4 or a sequence at least 85% identical thereto. In one embodiment, the anti-sEng antibody or sEng-binding fragment thereof has a heavy chain comprising SEQ ID NO:12 or a sequence at least 85% identical thereto and/or the anti-sEng antibody or sEng-binding fragment thereof has a light chain comprising SEQ ID NO:14 or a sequence at least 85% identical thereto.

In one aspect, provided is a method of treating or preventing an sEng-related disorder, such as a pregnancy-related hypertensive disorder, in a subject in need thereof, the method comprising providing ex vivo to the subject an anti-sEng antibody or sEng-binding fragment thereof, which competes for binding to sEng with an antibody comprising one, two, or three heavy chain CDRs having SEQ ID NO:5, SEQ ID NO:6, and/or SEQ ID NO:7 and/or one, two, or three light chain CDRs having SEQ ID NO:8, SEQ ID NO:9, and/or SEQ ID NO:10. In certain embodiments, the method comprises providing ex vivo to the subject an anti-sEng antibody or sEng-binding fragment thereof, which competes with an antibody comprising one, two, or three heavy chain CDRs having substantially the same sequence as SEQ ID NO:5, SEQ ID NO:6, and/or SEQ ID NO:7 and/or one, two, or three light chain CDRs having substantially the same sequence as SEQ ID NO:8 SEQ ID NO:9, and/or SEQ ID NO:10. In certain embodiments, the method comprises providing ex vivo to the subject an anti-sEng antibody or sEng-binding fragment thereof, which competes with an antibody comprising a CDR1H comprising SEQ ID NO:5, a CDR2H comprising SEQ ID NO:6, a CDR3H comprising SEQ ID NO:7, a CDR1L comprising SEQ ID NO:8, a CDR2L comprising SEQ ID NO:9, and a CDR3L comprising SEQ ID NO:10. In certain embodiments, the method comprises providing ex vivo to the subject an anti-sEng antibody or sEng-binding fragment thereof, which competes with an antibody comprising a heavy chain variable region comprising SEQ ID NO:2 or a sequence at least 85% identical thereto and/or comprising a light chain variable region comprising SEQ ID NO:4 or a sequence at least 85% identical thereto In certain embodiments, the method comprises providing ex vivo to the subject an anti-sEng antibody or sEng-binding fragment thereof, which competes with an antibody comprising a heavy chain comprising SEQ ID NO:12 or a sequence at least 85% identical thereto and/or comprising a light chain comprising SEQ ID NO:14 or a sequence at least 85% identical thereto.

In one embodiment, the method of treating or preventing a pregnancy-related hypertensive disorder comprises:
(a) removing blood from the subject;
(b) passing the blood or a component thereof over a solid support to which are attached anti-sEng antibodies or sEng-binding fragments thereof, to decrease the level of sEng in the blood or component thereof, and
(c) returning the blood or component thereof to the subject's body.

In one embodiment, the blood or a component thereof comprises plasma. In one embodiment, the method further comprises a step of separating the blood into plasma and cellular components and passing the plasma over the solid support. In certain embodiments, the method comprises removing a volume of the subject's blood and separating the blood into plasma and cellular components before contacting the plasma with anti-sEng antibodies or sEng-binding fragments thereof bound to a solid support.

In one embodiment, provided is a system comprising:
(a) anti-sEng antibodies or sEng-binding fragments thereof disclosed herein, wherein the anti-sEng antibodies or sEng-binding fragments thereof are attached to a solid support;
(b) a first means for conveying blood or a component thereof from a subject to the anti-sEng antibodies or sEng-binding fragments thereof bound to the solid support so as to contact the blood or a component thereof with the anti-sEng antibodies or sEng-binding fragments thereof and thereby to remove sEng from the blood or a component thereof; and
(c) a second means for conveying the blood or a component thereof to the subject following contact of the blood or a component thereof with the anti-sEng antibodies or sEng-binding fragments thereof.

In one embodiment, the first means comprises a device for separating the subject's blood into plasma and cellular components. In one embodiment, the device for separating the subject's blood into plasma and cellular components is a centrifuge or an apheresis device.

In one embodiment, the first means comprises
(i) an access device, inserted into a blood vessel of the subject, for accessing the subject's blood system; and
(ii) a conduit system, which fluidly connects the access device to the anti-sEng antibodies, or sEng-binding fragments thereof, bound to the solid support, thereby allowing the subject's blood or a component thereof to flow to and contact the anti-sEng antibodies, or sEng-binding fragments thereof.

In one embodiment, the second means comprises
(i) a conduit system; and
(ii) a return device, where the return device is inserted into a blood vessel of the subject, and where the conduit system fluidly connects the blood or a component thereof in contact with the anti-sEng antibodies, or sEng-binding fragments thereof, to the return device so as to allow for the return of the blood or a component thereof to the subject.

In one embodiment, the system comprises (i) an anti-sEng antibody or sEng-binding fragment thereof disclosed herein and/or (ii) an anti-sEng antibody that competes for binding to sEng with an anti-sEng antibody or sEng-binding fragment thereof disclosed herein.

In one embodiment, provided is a column containing anti-sEng antibodies or sEng-binding fragments thereof disclosed herein bound to a solid support. In some embodiments, the column is suitable for use in treating or preventing a pregnancy-related hypertensive disorder such as eclampsia or pre-eclampsia.

In one embodiment, the column contains anti-sEng antibodies or sEng-binding fragments thereof, wherein the anti-sEng antibodies, or sEng-binding fragments thereof comprise a heavy chain variable region and a light chain variable region, wherein each of the heavy chain and the light chain variable regions comprises a CDR1, CDR2, and CDR3, and wherein the sequence of CDR1H comprises SEQ ID NO:5, the sequence of CDR2H comprises SEQ ID NO:6, the sequence of CDR3H comprises SEQ ID NO:7, the sequence of CDR1L comprises SEQ ID NO:8, the sequence of CDR2L comprises SEQ ID NO:9, and the sequence of CDR3L comprises SEQ ID NO:10. In one embodiment, the column contains anti-sEng antibodies or sEng-binding fragments thereof, wherein the heavy chain of the anti-sEng antibodies or sEng-binding fragments thereof comprises SEQ ID NO:2 or a sequence at least 85% identical thereto and/or wherein the light chain of the anti-sEng antibodies or sEng-binding fragments thereof comprises SEQ ID NO:4 or a sequence at least 85% identical thereto. In one embodiment, the column contains anti-sEng antibodies or sEng-binding fragments thereof, wherein the heavy chain of the anti-sEng antibodies or sEng-binding fragments thereof comprises SEQ ID NO:12 or a sequence at least 85% identical thereto and/or wherein the light chain of the anti-sEng antibodies or sEng-binding fragments thereof comprises SEQ ID NO:14 or a sequence at least 85% identical thereto. In one aspect, the column contains anti-sEng antibodies or sEng-binding fragments thereof that bind to the orphan domain of human sEng.

BRIEF DESCRIPTION OF THE FIGURES

FIG. 3A-3C illustrates the binding of different anti-sEng antibodies to the Zona Pellucida (ZP) domain of sEng (FIG. 3A), the orphan domain sEng (FIG. 3B) or the full-length ectodomain of sEng (FIG. 3C). The binding of different sEng antibodies to the indicated sEng domains was determined by binding ELISA. Increased optical density (OD) at 450 nm indicated increased binding. Monoclonal anti-Endoglin antibody DY1097, which binds to the orphan domain of Endoglin, served as a control.

FIG. 4A. SEC chromatograms of antibody cENG10 ("αEng", elution volume 1.32 ml), sEng (1.10 ml), and the antibody/sEng complex ("αEng+sEng", 0.91 mL and 1.05 mL). mAU=arbitrary units, absorption at 280 nm. FIG. 4B. Dose-dependent binding of cENG10 to sEng by ELISA. Microplate wells were coated with 2 μg/ml sEng and blocked before serial dilutions of purified antibody cENG10 were added. Bound cENG10 was detected by horseradish peroxidase (HRP)-conjugated polyclonal antibodies against the Fc region of human IgG, followed by a colorimetric reaction.

DETAILED DESCRIPTION

Figure 1:
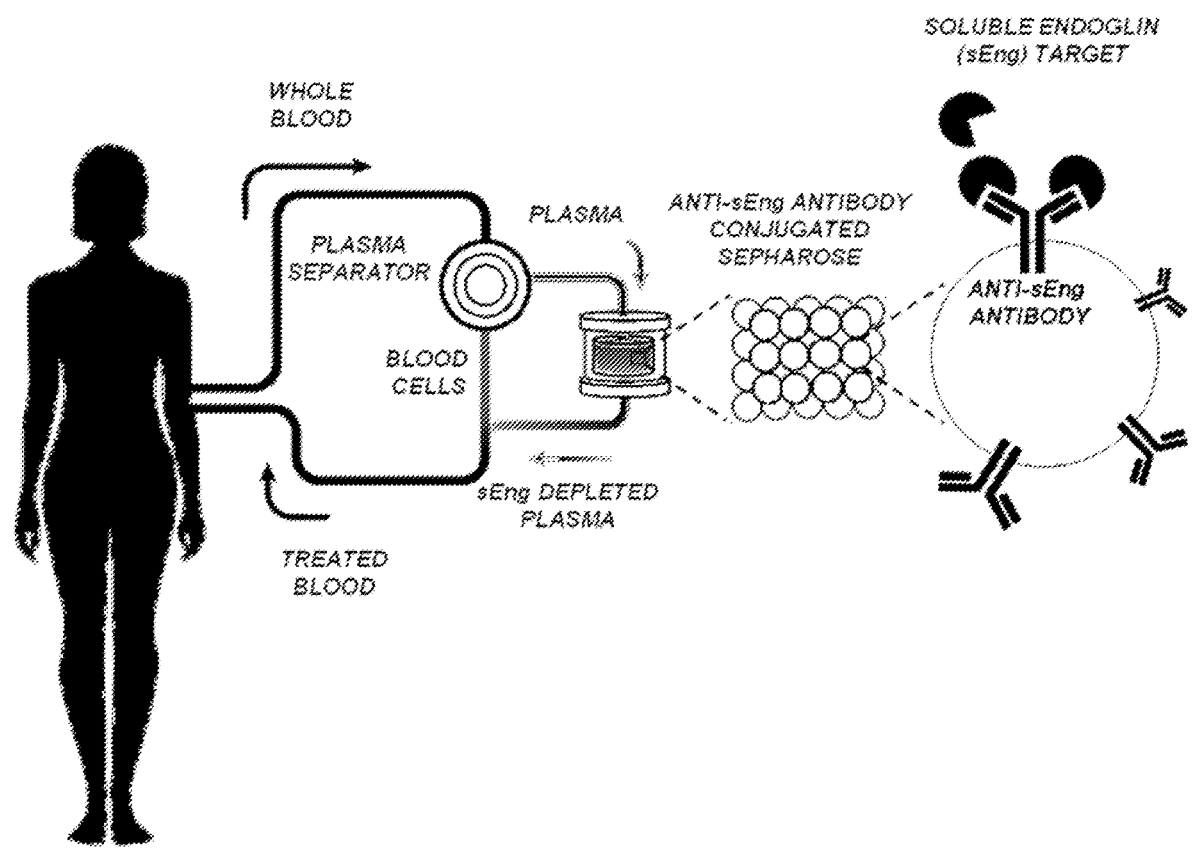
FIG. 1 illustrates one embodiment of the present disclosure, wherein blood from a subject is separated into plasma and cellular components. The cellular components are then returned to the subject, while the plasma is conveyed to a column filled with SEPHAROSE® beads to which anti-sEng antibodies have been attached. The anti-sEng antibodies deplete the plasma of sEng, and the sEng-depleted plasma recombines with cellular components and is returned to the subject.

The present invention provides a method of treating or preventing an sEng-related disease or disorder comprising providing ex vivo to the subject anti-sEng-binding substances, including but not limited to sEng ligands and binding proteins, anti-sEng antibodies, and sEng-binding fragments thereof, in an amount sufficient and for a time sufficient to decrease the subject's blood levels of sEng. "Ex vivo" refers to practicing the methods of treatment or prevention disclosed herein outside the body of a subject, i.e., extracorporeally, whereby the subject's blood or blood component (e.g., plasma) is contacted with anti-sEng antibodies or sEng-binding fragments thereof outside the body of the subject.

In one embodiment, provided is a method of treating or preventing a pregnancy-related hypertensive disorder in a subject having or at risk of developing a pregnancy-related hypertensive disorder and thus in need of treatment or prevention for a pregnancy-related hypertensive disorder, comprising providing ex vivo to the subject anti-sEng-binding substances, including but not limited to sEng ligands and binding proteins, anti-sEng antibodies, and sEng-binding fragments thereof in an amount sufficient and for a time sufficient to decrease the subject's blood levels of sEng, thereby treating or preventing the pregnancy-related hypertensive disorder in the subject. In some embodiments, the pregnancy-related hypertensive disorder is eclampsia, pre-eclampsia, HELLP syndrome, or postpartum hypertension. In certain embodiments, the pregnancy-related hypertensive disorder is pre-eclampsia. In certain embodiments, the pregnancy-related hypertensive disorder is HELLP syndrome.

In another embodiment, provided is a method of treating or preventing a non-hypertensive sEng-related disorder in a subject having or at risk of developing a non-hypertensive sEng-related disorder and thus in need of treatment or prevention for a non-hypertensive sEng-related disorder, comprising providing ex vivo to the subject anti-sEng-binding substances, including but not limited to sEng ligands and binding proteins, anti-sEng antibodies, and sEng-binding fragments thereof in an amount sufficient and for a time sufficient to decrease the subject's blood levels of sEng, thereby treating or preventing the non-hypertensive sEng-related disorder.

In some embodiments, the non-hypertensive sEng-related disorder is chronic kidney disease or systemic sclerosis (scleroderma). In another embodiment, the invention provides a method of treating or preventing chronic kidney disease. In another embodiment, the invention provides a method of treating or preventing systemic sclerosis (scleroderma).

sEng levels are typically elevated during the last several weeks of a normal pregnancy, and may not be accompanied by a hypertensive disorder. Accordingly, in some embodiments, the invention is used to treat non-hypertensive sEng-related disorders of late stage pregnancy and labor or prophylactically to prevent occurrence of such disorders. In one embodiment, the non-hypertensive sEng-related disorder of late stage pregnancy and labor is pre-term labor.

Several factors have been reported to have an association with fetal and placental development and severe pre-eclampsia. In addition to soluble Flt-1 receptor (sFlt-1, also known as sVEGFR1) and the ligands it sequesters, the soluble Endoglin (sEng) levels in pregnant women precede the onset of pre-eclampsia symptoms and are highly correlated with disease severity and clinical outcome.

Membrane-bound Endoglin, also known as CD105, is an accessory receptor for transforming growth factor ligands (TGF-β). Eng is a homodimeric, disulfide-linked transmembrane glycoprotein comprising a large extracellular domain (ectodomain), a hydrophobic transmembrane domain, and a short intracellular domain. Two isoforms of Eng receptor exist, L (long) and S (short), which differ in the length of intracellular domain, tissue distribution, and degree of phosphorylation. GenBank accession numbers NM_001114753 and NM_000118 provide the nucleotide and amino acid sequences of human L-Endoglin and S-Endoglin receptors, respectively. Both of these isoforms of Endoglin are highly expressed in endothelial cells and placental syncytiotrophoblast cells, as well as in monocytes and erythropoietic cells at lower levels.

Soluble Endoglin (sEng) lacks the transmembrane and cytoplasmic domains of the full-length L- and S-Endoglin receptors, as it is cleaved from the transmembrane domain and the cytoplasmic domain of the L- or S-Endoglin membrane-bound receptors. "Soluble Endoglin (sEng)" refers to a soluble form of the receptor Endoglin that is identical or homologous to the protein defined by GenBank accession number X72012, and has sEng biological activity. As used herein, sEng may refer to any sEng family member, sEng spliced isoform, and/or sEng degradation product. Non-limiting examples include sEng isoforms that are recognized to be cleaved between residues in the ectodomain. In one embodiment, sEng is the full soluble ectodomain product cleaved by a membrane-bound metalloprotease at the junction between ectodomain and the transmembrane domain of the L-Endoglin receptor, the major isoform with a cytoplasmic tail of 47 residues (Transcript variant 1, Accession #NM_001114753), and the S-Endoglin receptor containing a 14 residue cytoplasmic tail (Transcript variant 2, Accession #NM_000118). The term sEng may also refer to degradation products or fragments that result from enzymatic or cleavages other than metalloproteases that cleave at the C-terminal end of the extracellular domain (residues 26 to 586). In one embodiment, the soluble Endoglin product released from the placenta and into the circulation of pre-eclampsia patients is truncated at the ZP domain, with the truncated sEng product spanning residues 27 to 393 (Venkatesha et al, Nat Med. 2006 June; 12(6):642-9). The biological activity of sEng may be assayed using any standard method, for example, by binding to Bone Morphogenetic Protein 9 (BMP9) or BMP10, to TGF-β1 or TGF-β3 ligand in complex with TGFβ Receptor I or II, or by assaying its ability to inhibit BMP10-induced alkaline phosphatase production in MC3T3E1 mouse pre-osteoblast cell line.

In endothelial cells, TGF-β1 and TGF-β3 bind Endoglin with high affinity in the presence of TGF-β receptor II (TGFβ RII) and/or the TGF-β receptor I (TGF-β RI, or ALK5), to promote proliferation and activation of endothelial cells. As such, The TGF-β1 and TGF-β3 ligands contribute to angiogenesis that is critical for the developing fetus and/or the placenta.

The sEng protein sequesters the TGF-β1 and TGF-β3 ligands when these ligands are bound to TGF-β receptor I and/or II. As such, sEng prevents ligand binding to the membrane-bound forms of Eng, thereby attenuating the TGF-β and Smad-mediated signaling and angiogenesis. Also, sEng downregulates TGF-β signaling and attenuates endothelial nitric acid synthase (eNOS) activation in endothelial cells, leading to decreased nitric oxide availability and disrupted vascular homeostasis.

On endothelial cells, BMP ligands bind membrane forms of Endoglin and activate another type I receptor called the activin receptor-like kinase 1 (ALK1) and a type II BMP-RII receptor. ALK1 activation leads to a Smad-mediated signaling distinct from TGF-β pathway and affects cell proliferation, angiogenesis and vascular homeostasis. The sEng protein can also bind directly to BMP9 and BMP10 ligands.

sEng was identified in sera of pregnant women and was found to be expressed in the placenta and released into the circulation of severe pre-eclampsia patients (Venkatesha et al, Nat Med. 2006 June; 12(6):642-9). Adenoviral overexpression of sEng and sFlt-1 in rats resulted in severe pre-eclampsia phenotypes of increased blood pressure, high proteinuria and severe glomerular endotheliosis, and overexpression of sEng and sFlt-1 in mice interfered with endothelial cell stability and development of periventricular edema. Increased sEng levels were also found in the vascular surgical samples of patients with brain arteriovenous malformations, similar to those found in hereditary hemorrhagic telangiectasia type 1 (HHT1) patients, in which Endoglin haploinsufficiency may be an underlying cause of focal loss of capillaries and arteriovenous malformations. The elevated levels of sEng and sFlt-1 found in the sera of pregnant women suffering from, or at risk of developing, a pregnancy-related hypertensive disorder (e.g., severe pre-eclampsia, eclampsia, or HELLP syndrome) indicate that sEng acts as a "physiologic sink" to bind to and deplete the trophoblast cells and maternal endothelial cells of functional growth factors such as TGF-β ligands required for the proper development and angiogenesis of the fetus and/or the placenta.

"sEng-binding substances" include antibodies, antibody fragments, ligands, and any other binding molecules (e.g., natural or synthetic proteins, polypeptides, and polymers) that selectively bind to sEng. "Anti-sEng antibody" refers to an antibody or fragment thereof that is capable of binding to sEng. "sEng-binding fragment" of an anti-sEng antibody refers to a portion of an anti-sEng antibody that retains the ability to bind sEng. "sEng ligand" refers to a protein or derivative thereof that binds to sEng. Naturally occurring sEng ligands include, without limitation, BMP9, BMP10, and TGF-β, including, but not limited to TGF-β1 and TGF-β3.

The sEng-binding substances disclosed herein are effective to efficiently deplete sEng in blood or plasma from a subject. The sEng can be soluble, or in microparticles circulating in the bloodstream. Heparin can be administered to the subject to release tissue-bound sEng, enhancing ex vivo depletion of sEng and minimizing the pool of non-circulating sEng left in the subject. In either case, the sEng is removed from the blood or plasma by virtue of being captured by the solid-support bound sEng-binding substances disclosed herein, and is no longer available to bind to, and thus reduce the concentration of, ligands such as TGF-β1 and/or TGF-β3 in the blood or plasma.

In one embodiment, the sEng-binding substance binds to a site on sEng such that binding of BMP9, BMP10, TGF-β1 and/or TGF-β3 to Endoglin is not blocked.

In one embodiment, the sEng-binding substances disclosed herein are employed in the ex vivo methods disclosed herein, and bind to sEng molecules that are not bound by sEng ligands, removing those sEng molecules from blood or plasma.

In one embodiment, the sEng-binding substances disclosed herein bind to the ectodomain of an Endoglin monomer, dimer, or oligomer. In one embodiment, the sEng-binding substances disclosed herein bind to the extracellular orphan domain (OD) of an sEng monomer, dimer or oligomer, and optionally the linker region between the OD and the ZPD of an sEng monomer, dimer or oligomer.

In certain embodiments, the sEng-binding substances disclosed herein bind to an epitope that is present in all degradation products, fragments or isoforms of sEng.

Non-limiting examples of anti-sEng antibody sequences are provided. In certain embodiments, the anti-sEng antibodies or sEng-binding fragments thereof comprise one, two, or three heavy chain CDRs having SEQ ID NO:5, SEQ ID NO:6, and/or SEQ ID NO:7 and/or one, two, or three light chain CDRs having SEQ ID NO:8, SEQ ID NO:9, and/or SEQ ID NO:10. In certain embodiments, anti-sEng antibodies or sEng-binding fragments thereof comprise one, two, or three heavy chain CDRs having substantially the same sequence as SEQ ID NO:5, SEQ ID NO:6, and/or SEQ ID NO:7 and/or one, two, or three light chain CDRs having substantially the same sequence as SEQ ID NO:8 SEQ ID NO:9, and/or SEQ ID NO:10. In one embodiment, the anti-sEng antibody or sEng-binding fragment thereof comprises a heavy chain variable region and a light chain variable region, wherein each of the heavy chain and the light chain variable regions comprises a CDR1, CDR2, and CDR3, and wherein CDR1H comprises SEQ ID NO:5, CDR2H comprises SEQ ID NO:6, CDR3H comprises SEQ ID NO:7, CDR1L comprises SEQ ID NO:8, CDR2L comprises SEQ ID NO:9, and CDR3L comprises SEQ ID NO:10. In certain embodiments, the anti-sEng antibody or sEng-binding fragment thereof comprises at least one variable region comprising an amino acid sequence selected from SEQ ID NOs:2 and 4, or a sequence at least 85% at least 90%, at least 95%, at least 96%, at least 97%, at least 98%, or at least 99%, identical to SEQ ID NOs:2 or 4.

"Identity" refers to the number or percentage of identical positions shared by two amino acid or nucleic acid sequences, taking into account the number of gaps, and the length of each gap, which need to be introduced for optimal alignment of the two sequences. "Substantially identical" means an amino acid sequence that which differs only (i) by conservative amino acid substitutions, for example, substitution of one amino acid for another of the same class (e.g., valine for glycine, arginine for lysine, etc.) or (ii) by one or more non-conservative substitutions, deletions, or insertions located at positions of the amino acid sequence which do not destroy the function of the protein. Preferably, the amino acid sequence is at least 80%, at least 85%, at least 90%, at least 95%, at least 96%, at least 97%, at least 98%, or at least 99% similar to another amino acid sequence. Methods and computer programs for determining sequence similarity are publicly available, including, but not limited to, the GCG program package (Devereux et al., Nucleic Acids Research 12: 387, 1984), BLASTP, BLASTN, FASTA (Altschul et al., J. Mol. Biol. 215:403 (1990), and the ALIGN program (version 2.0). The well-known Smith-Waterman algorithm may also be used to determine similarity. The BLAST program is publicly available from NCBI and other sources (BLAST Manual, Altschul, et al., NCBI NLM NIH, Bethesda, Md. 20894; BLAST 2.0 at http://www.ncbi.nlm-.nih.gov/blast/). In comparing sequences, these methods account for various substitutions, deletions, and other modifications. Conservative substitutions typically include substitutions within the following groups: glycine, alanine; valine, isoleucine, leucine; aspartic acid, glutamic acid, asparagine, glutamine; serine, threonine; lysine, arginine; and phenylalanine, tyrosine.

It is observed herein that the ability of an antibody to deplete sEng from blood or a component thereof is not necessarily dependent on binding affinity, but also can depend on certain other characteristics, such as the domains or epitope of sEng to which the antibody binds.

In certain embodiments, the anti-sEng antibody or sEng-binding fragment thereof competes for binding with an antibody which comprises one, two, or three heavy chain CDRs comprising SEQ ID NO:5, SEQ ID NO:6, and/or SEQ ID NO:7 and/or one, two, or three light chain CDRs comprising SEQ ID NO:8, SEQ ID NO:9, and/or SEQ ID NO:10. In certain embodiments, the anti-sEng antibody or sEng-binding fragment thereof competes for binding with an antibody which comprises one, two, or three heavy chain CDRs comprising substantially the same sequence as SEQ ID NO:5, SEQ ID NO:6, and/or SEQ ID NO:7 and/or one, two, or three light chain CDRs comprising substantially the same sequence as SEQ ID NO:8, SEQ ID NO:9, and/or SEQ ID NO:10. In certain embodiments, the anti-sEng antibody or sEng-binding fragment thereof competes with an antibody comprising a CDR1H comprising SEQ ID NO:5, a CDR2H comprising SEQ ID NO:6, a CDR3H comprising SEQ ID NO:7, a CDR1L comprising SEQ ID NO:8, a CDR2L comprising SEQ ID NO:9, and a CDR3L comprising SEQ ID NO:10. In some embodiments, the anti-sEng antibody or sEng-binding fragment thereof competes for binding with an anti-sEng antibody or sEng-binding fragment thereof, which comprises at least one variable region comprising an amino acid sequence selected from SEQ ID NOs:2 and 4, or a sequence at least 85% at least 90%, at least 95%, at least 96%, at least 97%, at least 98%, or at least 99%, identical thereto. In some embodiments, the anti-sEng antibody or sEng-binding fragment thereof competes for binding with an anti-sEng antibody or sEng-binding fragment thereof, which comprises at least one amino acid sequence selected from SEQ ID NOs:12 and 14, or a sequence at least 85% at least 90%, at least 95%, at least 96%, at least 97%, at least 98%, or at least 99%, identical thereto.

In certain embodiments, the sEng antibody or sEng-binding fragment thereof binds to an epitope on human sEng that is bound by one or more of the antibodies referred to herein as MAb 210 or cENG10. Two antibodies "compete" (i.e., bind to the same or overlapping epitope) if each competitively inhibits (blocks) binding of the other to the antigen. That is, a 1×, 5×, 10×, 20×, or 100× excess of one antibody inhibits binding of the other by at least 50%, preferably 75%, 90%, or even 99% as measured in a competitive binding assay (see, e.g., Junghans et al., Cancer Res. 50:1495, 1990). Additional methods of determining whether one antibody binds to the same or overlapping epitope as another antibody are well known in the art.

In certain embodiments, anti-sEng antibody or sEng-binding fragment thereof binds human sEng but does not bind human Eng. In certain embodiments, the anti-sEng antibody or sEng-binding fragment thereof recognizes the extracellular domain of Endoglin. In certain embodiments, anti-sEng antibody or sEng-binding fragment thereof recognizes an epitope in sEng that is not present in membrane-bound Eng. In certain embodiments, such an epitope not present in Eng is a discontinuous epitope or a conformational epitope of Eng. In certain embodiments, anti-sEng antibody or sEng-binding fragment thereof binds to the ligand binding site of sEng.

In certain embodiments, the anti-sEng antibodies or sEng-binding fragments thereof disclosed herein are particularly suitable for administration to a subject. For example, the antibodies can be modified to minimize immunogenicity and/or hypersensitivity in a subject. Such modifications can provide an additional safety factor in the event that antibodies are leached from a column or other solid support used for ex vivo treatment of a subject.

Further, in certain embodiments, the anti-sEng antibodies or sEng-binding fragments thereof disclosed herein can be administered in vivo to treat a pregnancy-related hypertensive disorder. In some embodiments, the pregnancy-related hypertensive disorder is eclampsia, pre-eclampsia, HELLP syndrome, or postpartum hypertension. In certain embodiments, the pregnancy-related hypertensive disorder is pre-eclampsia.

In certain embodiments, the anti-sEng antibodies or sEng-binding fragments thereof disclosed herein can be administered in vivo to treat a non-hypertensive sEng-related disorder. In some embodiments, the non-hypertensive sEng-related disorder is chronic kidney disease, systemic sclerosis (scleroderma), or a non-hypertensive sEng-related disorder of late stage pregnancy and labor. In one embodiment, the non-hypertensive sEng-related disorder of late stage pregnancy and labor is pre-term labor.

Thus, for both ex vivo and in vivo treatment, antibodies disclosed herein include chimeric or humanized antibodies, as well as antigen binding fragments of the anti-sEng antibodies.

In one embodiment, the anti-sEng antibody or sEng-binding fragment thereof comprises one or more variable regions comprising SEQ ID NO:2 and/or SEQ ID NO:4 and a human IgG1 constant region. In one embodiment, the anti-sEng antibody or sEng-binding fragment thereof comprises SEQ ID NO:12 and/or SEQ ID NO:14.

The antibodies may also be modified to minimize or eliminate other effects. In one embodiment, the constant region of the anti-sEng antibody of fragment thereof disclosed herein may include a mutation that prevents glycosylation. For example, the heavy chain of anti-sEng antibody cENG10 (SEQ ID NO:12) contains a N300Q mutation. Antibodies containing this mutation are deficient in effector functions, such as complement activation and binding to Fc. In another embodiment, the anti-sEng antibody of fragment thereof disclosed herein may contain a mutation that disrupts binding of the antibody to neonatal Fc receptor (FcRn). The FcRn receptor facilitates transport of maternal IgG across the placenta to the fetus. Accordingly, an anti-sEng antibody or sEng-binding fragment thereof with a mutation that disrupts binding of the antibody to FcRn would bind sEng in the treatment subject, but would not be transported to the growing fetus. For example, the heavy chain of anti-sEng antibody cENG10 (SEQ ID NO:12) may contain a I256A mutation. In one embodiment, the anti-sEng antibody or sEng-binding fragment thereof disclosed herein may contain both mutations (for example N300Q and I256A in SEQ ID NO:12).

Disclosed herein are anti-sEng antibodies and sEng-binding fragments thereof hat are suitable for use in the present methods and systems, including, but not limited to antibodies 201-216 (e.g. described in Example 1) and antibody cENG10. Also contemplated are anti-sEng antibodies and sEng-binding fragments thereof that comprise the variable region sequences and/or CDRs of the anti-sEng antibodies disclosed herein as well as anti-sEng antibodies or sEng-binding fragments thereof that comprise variable region sequences or CDRs that have certain specified levels of identity in amino acid sequence to the variable region sequences or CDRs of the anti-sEng antibodies or sEng-binding fragments thereof disclosed herein.

In designing and producing additional anti-sEng antibodies, those skilled in the art may be guided by certain well known features of antibodies. The structure of typical naturally occurring antibodies is well known and includes two identical heavy chains and two identical light chains, with each light chain covalently linked to a heavy chain by an interchain disulfide bond. The two heavy chains are linked to one another by additional disulfide bonds. Individual heavy and light chains can fold into domains having similar sizes (110-125 amino acids) and structures, but different functions. Light chains can comprise one variable domain ($V_L$) and/or one constant domain ($C_L$). Heavy chains can also comprise one variable domain ($V_H$) and/or three or four constant domains ($C_H1$, $C_H2$, $C_H3$ and $C_H4$), depending on the class or isotype of antibody. In humans, the isotypes are IgA, IgD, IgE, IgG, and IgM, with IgA and IgG further subdivided into subclasses or subtypes ($IgA_{1-2}$ and $IgG_{1-4}$).

It has been found to be convenient to consider certain portions of antibody molecules individually. The portion of an antibody consisting of $V_L$ and $V_H$ domains is designated Fv (fragment variable) and constitutes the antigen-binding site. An antibody fragment containing a $V_L$ domain and a $V_H$ domain on one polypeptide chain is referred to as a single chain Fv (scFv) and generally contains the N terminus of one domain and the C terminus of the other domain joined by a flexible linker (see, e.g., U.S. Pat. No. 4,946,778 and International Patent Publication WO 88/09344.

For certain embodiments disclosed herein, it may be advantageous to employ scFv fragments because scFv fragments lack some or all of the constant domains of whole antibodies. Therefore, they can overcome some of the side-effects associated with the use of whole antibodies. For example, scFv fragments tend to be free of certain undesired interactions between heavy-chain constant regions and other biological molecules.

In certain embodiments, the anti-sEng antibodies or sEng-binding fragments disclosed herein are multivalent single chain antibodies, where multiple single chain antibodies, each single chain having one $V_H$ and one $V_L$ domain covalently linked by a first peptide linker, are covalently linked by at least one or more second peptide linkers to form a multivalent single chain antibody. Each chain of a multivalent single chain antibody includes a variable light chain fragment and a variable heavy chain fragment, and is linked by the second peptide linker to at least one other chain. The second peptide linker is preferably composed of at least fifteen and fewer than one hundred amino acid residues.

In certain embodiments, the anti-sEng antibodies or sEng-binding fragments disclosed herein are diabodies, where two single chain antibodies are combined to form a diabody. Diabodies have two chains and two binding sites, each specific for sEng. Each chain of the diabody includes a $V_H$ domain connected to a $V_L$ domain. The domains are connected with linkers that are short enough to prevent pairing between domains on the same chain, thus driving the pairing between complementary domains on different chains to recreate the two antigen-binding sites.

In certain embodiments, the anti-sEng antibodies or sEng-binding fragments disclosed herein are triabodies, where three single chain antibodies are combined to form a triabody. In triabodies, the amino acid terminus of a $V_L$ or $V_H$ domain is directly fused to the carboxyl terminus of a $V_L$ or $V_H$ domain, i.e., without any linker sequence. The triabody has three Fv heads with the polypeptides arranged in a cyclic, head-to-tail fashion.

In certain embodiments, the anti-sEng antibodies or sEng-binding fragments disclosed herein are Fab fragments. Fab fragments are fragments of an antibody consisting of $V_L$, $C_L$, $V_H$, and $C_H1$ domains. Those generated following papain digestion simply are referred to as Fab and lack the heavy chain hinge region. Following pepsin digestion, various Fabs retaining the heavy chain hinge are generated. Those divalent fragments with the interchain disulfide bonds intact are referred to as $F(ab')_2$, while a monovalent Fab results when the disulfide bonds are not retained.

Thus, anti-sEng antibodies, and sEng-binding fragments thereof, for use in the methods and systems disclosed herein include, but are not limited to, naturally occurring antibodies, bivalent fragments such as $(Fab')_2$, monovalent fragments such as Fab, single chain antibodies, single chain Fv (scFv), single domain antibodies, multivalent single chain antibodies, diabodies, triabodies, and the like that bind sEng.

In certain embodiments, specificity of antibodies, or fragments thereof, can be determined based on affinity and/or avidity. "Affinity", represented by the equilibrium constant for the dissociation of an antigen with an antibody ($K_d$), measures the binding strength between an antigenic determinant and an antibody-binding site. "Avidity" is the measure of the strength of binding between an antibody with its antigen. Avidity is related to both the affinity between an epitope with its antigen-binding site on the antibody, and the valence of the antibody, which refers to the number of antigen binding sites of a particular epitope. Antibodies typically bind to their antigens with a dissociation constant ($K_d$) of $10^{-5}$ to $10^{-11}$ moles/liter (M). Any $K_d$ greater than $10^4$ moles/liter is generally considered to indicate nonspecific binding. The lesser the value of the $K_d$, the stronger the binding strength between an antigenic determinant and the antibody binding site.

In certain embodiments, the anti-sEng antibodies or sEng-binding fragments thereof bind sEng with a dissociation constant ($K_d$) of about $10^{-5}$ to $10^{-11}$ moles/liter, about $10^{-6}$ to $10^{-10}$ moles/liter, or about $10^{-7}$ to $10^{-9}$ moles/liter. In certain embodiments, anti-sEng antibodies, or sEng-binding fragments, bind to sEng with a dissociation constant ($K_d$) of at least about $10^{-5}$ moles/liter, at least $10^{-6}$ moles/liter, at least $10^{-7}$ moles/liter, at least $10^{-8}$ moles/liter, at least $10^{-9}$ moles/liter, at least $10^{-10}$ moles/liter, or at least $10^{-11}$ moles/liter. In certain embodiments, the $K_d$ is from $10^{-9}$ moles/liter to $10^{-10}$ moles/liter. In certain embodiments, embodiments, the $K_d$ is from $10^{-10}$ moles/liter to $10^{-11}$ moles/liter. In certain embodiments, embodiments, the $K_d$ is from $10^{-8}$ moles/liter to $10^{-10}$ moles/liter.

The anti-sEng antibodies or sEng-binding fragments thereof disclosed herein further include those for which binding characteristics have been improved by direct mutation, methods of affinity maturation, phage display, or chain shuffling. Affinity and specificity can be modified or improved by mutating CDRs and screening for antigen binding sites having the desired characteristics (see, e.g., Yang et al., J. Mol. Biol., 254: 392-403 (1995)). CDRs can be mutated in a variety of ways. One way is to randomize individual residues or combinations of residues so that in a population of otherwise identical antigen binding sites, all twenty amino acids are found at particular positions. Alternatively, mutations may be induced over a range of CDR residues by error-prone PCR or other mutagenic methods (see, e.g., Hawkins et al., J. Mol. Biol., 226: 889-896 (1992)). For example, phage display vectors containing heavy and light chain variable region genes can be propagated in mutator strains of *E. coli* (see, e.g., Low et al., J. Mol. Biol., 250: 359-368 (1996)). These methods of mutagenesis are illustrative of the many methods known to one of skill in the art.

Anti-sEng antibodies or sEng-binding fragments thereof disclosed herein can be obtained by standard hybridoma technology (e.g., Harlow & Lane, ed., Antibodies: A Laboratory Manual, Cold Spring Harbor, 211-213 (1998), which is incorporated by reference herein) or by using transgenic mice (e.g., KM mice, originally from Medarex, San Jose, Calif.) that produce human immunoglobulin gamma heavy and kappa light chains. In certain mice known in the art, a substantial portion of the human antibody producing genome is inserted into the genome of the mice, and the mice are rendered deficient in the production of endogenous murine antibodies. Such mice may be immunized with part or all of sEng (e.g., human sEng), optionally in a suitable adjuvant, e.g., complete or incomplete Freund's adjuvant.

Methods for the preparation of antibodies suitable for use in the methods and systems disclosed herein are well known in the art and are described, e.g., in U.S. Pat. Nos. 6,054,297; 5,821,337; 6,365,157; and 6,165,464; U.S. Patent Application Publication No. 2006/0067937; International Patent Publication WO 06/034507; which are incorporated herein by reference.

The anti-sEng antibodies or sEng-binding fragments thereof disclosed herein may include polyclonal antibodies, monoclonal antibodies, humanized or chimeric antibodies, Fv fragments, single chain Fv fragments, Fab fragments, or F(ab')$_2$ fragments. In certain embodiments, the antibodies are mouse monoclonal antibodies. The anti-sEng antibodies or sEng-binding fragments thereof disclosed herein may include a variety of antibody isotypes, such as IgG1, IgG2, IgG3, IgG4, IgM, IgA1, IgA2, secretory IgA, IgD, and IgE.

"Chimeric antibody" refers to a polypeptide comprising at least the antigen-binding portion of an antibody molecule linked to at least part of another protein (typically an immunoglobulin constant domain).

"Humanized antibody" refers to an antibody with a framework region (FR) having substantially the amino acid sequence of a human immunoglobulin and a complementarity determining region (CDR) having substantially the amino acid sequence of a non-human immunoglobulin (the "import" sequences). Generally, a humanized antibody has one or more amino acid residues introduced into it from a source that is non-human. The humanized antibody will usually comprise substantially all of at least one, and typically two, variable domains (Fab, Fab', F(ab')$_2$, Fabc, Fv) in which all or substantially all of the CDR regions correspond to those of a non-human immunoglobulin and all or substantially all of the FR regions are those of a human immunoglobulin or a human immunoglobulin consensus sequence. The humanized antibody optimally will comprise at least a portion of an immunoglobulin constant region (Fc), typically that of a human immunoglobulin. By "complementarity determining region (CDR)" is meant the three hypervariable sequences in the variable regions within each of the immunoglobulin light and heavy chains. By "framework region (FR)" is meant the sequences of amino acids located on either side of the three hypervariable sequences (CDR) of the immunoglobulin light and heavy chains. The FR and CDR regions of the humanized antibody need not correspond precisely to the parental sequences, e.g., the import CDR or the human or consensus human FR may be mutagenized by substitution, insertion, or deletion of at least one residue so that the CDR or FR residue at that site does not correspond to either the consensus or the import sequence. Such mutations, however, will not be extensive. Usually, at least 75%, preferably 90%, and most preferably at least 95% of the humanized antibody residues will correspond to those of the parental FR and CDR sequences.

The anti-sEng antibodies or sEng-binding fragments thereof disclosed herein may be obtained directly from hybridomas, which express the anti-sEng antibodies or sEng-binding fragments thereof disclosed herein, or may be cloned and recombinantly expressed in suitable host cells (e.g., CHO cells, NS/0 cells, HEK293 cells). Suitable host cells include plant cells, mammalian cells, and microorganisms such as *E. coli* and yeast. Alternatively, the anti-sEng antibodies or sEng-binding fragments thereof disclosed herein may be produced recombinantly in a transgenic non-human plant or animal, e.g., a transgenic mouse.

In certain embodiments, the anti-sEng antibodies may be modified prior to, or after, attachment to a solid support. Possible modifications include glycosylation, deglycosylation, aglycosylation, acetylation, pegylation, phosphorylation, amidation, derivatization with protecting or blocking groups, proteolytic cleavage, or linkage to a cellular ligand or other protein. In certain embodiments, the anti-sEng antibodies may contain one or more non-classical amino acids.

Also provided herein are nucleic acids encoding the anti-sEng antibodies and sEng-binding fragments thereof disclosed herein, as well as vectors, host cells, and expression systems. The term "nucleic acid" as used herein refers to a polymeric form of nucleotides of any length, either ribonucleotides or deoxyribonucleotides. Thus, this term includes, but is not limited to, single-, double- or multi-stranded DNA or RNA, genomic DNA, cDNA, DNA-RNA hybrids, or a polymer comprising purine and pyrimidine bases, or other natural, chemically or biochemically modified, non-natural, or derivatized nucleotide bases.

In one embodiment, provided is a nucleic acid encoding a variable chain sequence comprising SEQ ID NO:2 or SEQ ID NO:4. In one embodiment, provided is a nucleic acid comprising SEQ ID NO:1 and/or SEQ ID NO:3.

In one embodiment, provided is a nucleic acid encoding a heavy chain sequence comprising SEQ ID NO:12. In one embodiment, provided is a nucleic acid encoding a light chain sequence comprising SEQ ID NO:14. In one embodiment, provided is a nucleic acid comprising SEQ ID NO:11 and/or SEQ ID NO:13.

The nucleic acids encoding the anti-sEng antibodies and sEng-binding fragments thereof disclosed herein may be, e.g., DNA, cDNA, RNA, synthetically produced DNA or RNA, or a recombinantly produced chimeric nucleic acid molecule comprising any of those polynucleotides either alone or in combination. For example, provided is an expression vector comprising a polynucleotide sequence encoding an anti-sEng antibody and sEng-binding fragment thereof disclosed herein operably linked to expression control sequences suitable for expression in a eukaryotic and/or prokaryotic host cell.

The term "vector" refers to a nucleic acid molecule capable of transporting another nucleic acid to which it has been linked. A "vector" includes, but is not limited to, a viral vector, a plasmid, a RNA vector or a linear or circular DNA or RNA molecule, which may consist of a chromosomal, non-chromosomal, semi-synthetic or synthetic nucleic acids. In some embodiments, the employed vectors are those capable of autonomous replication (episomal vector) and/or expression of nucleic acids to which they are linked (expression vectors). Large numbers of suitable vectors are known to those of skill in the art and commercially available. Viral vectors include retrovirus, adenovirus, parvovirus (e.g., adeno associated viruses, AAV), coronavirus, negative strand RNA viruses such as orthomyxovirus (e.g., influenza virus), rhabdovirus (e. g., rabies and vesicular stomatitis virus), paramyxovirus (e.g., measles and Sendai), positive strand RNA viruses such as picornavirus and alphavirus, and double-stranded DNA viruses including adenovirus, herpesvirus (e.g., Herpes Simplex virus types 1 and 2, Epstein-Barr virus, cytomegalovirus), and poxvirus (e.g., vaccinia, fowlpox and canarypox). Other viruses include Norwalk virus, togavirus, flavivirus, reoviruses, papovavirus, hepadnavirus, and hepatitis virus, for example. Examples of retroviruses include avian leukosis-sarcoma, mammalian C-type, B-type viruses, D type viruses, HTLV-BLV group, lentivirus, and spumavirus.

A variety of expression vectors have been developed for the efficient synthesis of antibodies and sEng-binding fragments thereof in prokaryotic cells such as bacteria and in eukaryotic systems, including but not limited to yeast and mammalian cell culture systems have been developed. The vectors can comprise segments of chromosomal, non-chromosomal and synthetic DNA sequences. Also provided are cells comprising expression vectors for the expression of the contemplated anti-sEng antibodies or sEng-binding fragments thereof.

In one aspect, the anti-sEng antibodies or sEng-binding fragments thereof disclosed herein are suitable for ex vivo treatment of an sEng-related disorder. Suitable means that the antibodies effectively reduce the concentration of sEng in a subject's blood or plasma when used in an effective amount for an effective time. For example, using a 50 ml/minute flow rate, 5 liters of plasma (approximately 1.5 human blood volumes) would be processed in 100 minutes or less. In one embodiment, a volumetric flow rate of 1 ml/min is applied to a 1 ml column. This is comparable to a volumetric 50 ml/min flow rate using a 50 ml column (and comparable to a residence time of 1 min). In other embodiments, a volumetric flow rate of 0.25, 0.5, or 2 ml/min is applied to a 1 ml column.

In one embodiment, the volumetric flow rate is between 0.05 and 100 mL/min. In one embodiment, the volumetric flow rate is between 0.1 mL/min and 10 mL/min. In one embodiment, the volumetric flow rate is between 0.25 mL/min and 5 mL/min. In one embodiment, the volumetric flow rate is between 0.5 mL/min and 3 mL/min. In one embodiment, the volumetric flow rate is 0.05 mL/min, 0.1 mL/min, 0.25 mL/min, 0.5 mL/min, 1 mL/min, 1.5 mL/min, 2 mL/min, 2.5 mL/min, 3 mL/min, 3.5 mL/min, 4 mL/min, 4.5 mL/min, 5 mL/min, 10 mL/min, 25 mL/min, 50 mL/min, or 100 mL/min. In one embodiment, the volumetric flow rate is less than 0.1 mL/min, less than 0.25 mL/min, less than 0.5 mL/min, less than 1 mL/min, less than 1.5 mL/min, less than 2 mL/min, less than 2.5 mL/min, less than 3 mL/min, less than 3.5 mL/min, less than 4 mL/min, less than 4.5 mL/min, less than 5 mL/min, less than 10 mL/min, less than 25 mL/min, less than 50 mL/min, or less than 100 mL/min.

In one embodiment, the linear flow rate is between 5 cm/h and 300 cm/h. In one embodiment, the linear flow rate is between 5 cm/h and 100 cm/h. In one embodiment, the linear flow rate is between 5 cm/h and 40 cm/h. In one embodiment, the linear flow rate is between 10 cm/h and 250 cm/h. In one embodiment, the linear flow rate is 9 cm/h, 18 cm/h, 38 cm/h, 73 cm/h, 76 cm/h, 113 cm/h, or 230 cm/h. In one embodiment, the linear flow rate is less than 9 cm/h, less than 18 cm/h, less than 38 cm/h, less than 73 cm/h, less than 76 cm/h, less than 113 cm/h, or less than 230 cm/h. In one embodiment, the linear flow rate is 10 cm/h, 20 cm/h, 30 cm/h, 40 cm/h, 50 cm/h, 70 cm/h, 80 cm/h, or 100 cm/h, 110 cm/h, 120 cm/h, 150 cm/h, 180 cm/h, 240 cm/h, or 300 cm/h. In one embodiment, the linear flow rate is less than 10 cm/h, less than 20 cm/h, less than 30 cm/h, less than 40 cm/h, less than 50 cm/h, less than 70 cm/h, less than 80 cm/h, less than 100 cm/h, less than 110 cm/h, less than 120 cm/h, less than 150 cm/h, less than 180 cm/h, less than 240 cm/h, or less than 300 cm/h.

The residence time of a given material, such as plasma, flowing through a volume, such as a column, is a measure of how much time the matter spends in the volume. Residence time depends on the flow velocity and the bed height of the column bed. In one embodiment, the residence time is between 0.25 min and 5 min. In one embodiment, the residence time is between 0.5 min and 2 min. In one embodiment, the residence time is between 2 min and 5 min. In one embodiment, the residence time is 0.25 min, 0.33 min, 0.5 min, 0.67 min, 1 min, 1.5 min, 2 min, 2.5 min, 3 min, 3.5 min, 4 min, 4.5 min, or 5 min. In one embodiment, the residence time is at least 0.33 min, at least 0.5 min, at least 0.67 min, at least 1 min, at least 1.5 min, at least 2 min, at least 2.5 min, at least 3 min, at least 3.5 min, at least 4 min, at least 4.5 min, or at least 5 min.

The anti-sEng antibodies or sEng-binding fragments thereof disclosed herein can be linked to Sepharose beads in amounts of, for example, 0.025, 0.05, 0.1, 0.2, 0.25, 0.4, 0.5, 0.8, 1, 2, or 5 mg antibody/ml beads. In some embodiments, the anti-sEng antibodies or sEng-binding fragments thereof disclosed herein are linked to Sepharose beads in amounts of at least 0.025, at least 0.05, at least 0.1, at least 0.2, at least 0.25, at least 0.4, at least 0.5, at least 0.8, at least 1, at least 2, or at least 5 mg antibody/ml beads. In some embodiments, for example for research purposes, columns of various dimensions containing 0.1-50 ml of Sepharose beads coupled with anti-sEng antibodies may be tested for their ability to deplete recombinant sEng spiked into buffered solutions or animal serum or human plasma, or native sEng in amniotic fluid or blood plasma of pre-eclampsia patients. The columns provided herein may have various aspect ratios (length:width). In some embodiments, the aspect ratio is about 1:1, about 2:1, about 5:1, about 10:1, about 20:1, about 30:1, about 40:1, or about 50:1.

In some embodiments, the sEng depletion experiments are conducted with columns containing anti-sEng antibody-coupled Sepharose beads at 0.025-20 mg of antibodies per 1 ml of beads (0.065-52 billion antibody molecules per single bead), at flow rates of 0.05-50 ml/min, at linear flow rates of 10-300 cm/hr, and residence times of 0.25-5 minutes. In some embodiments, 1 to 400 times the column bed volumes of buffered solutions, serum or plasma containing sEng are applied to the columns at anti-sEng antibody: sEng ratios of 5:1 to 5,000:1 (w/w), or molar ratios of 1.25:1 to 1,250:1. Under these ranges of conditions, columns containing Sepharose beads coupled with anti-sEng antibodies is expected to deplete 10 to 100% of sEng in buffered solutions, serum, or plasma. In some embodiments, columns containing Sepharose beads coupled with anti-sEng antibodies deplete 50 to 100% of sEng in buffered solutions, serum, or plasma.

In some embodiments, the antibody:sEng ratio in the column is 100:1 (w/w), 200:1 (w/w), 300:1 (w/w), 400:1 (w/w), 500:1 (w/w), 600:1 (w/w), 700:1 (w/w), 800:1 (w/w), 900:1 (w/w), 1,000:1 (w/w), 1,100:1 (w/w), 1,200:1 (w/w), 1,300:1 (w/w), 1,400:1 (w/w), 1,500:1 (w/w), 2,000:1 (w/w), 3,000:1 (w/w), 4,000:1 (w/w), or 5,000:1 (w/w). In some embodiments, the antibody:sEng ratio is at least 100:1 (w/w), at least 200:1 (w/w), at least 300:1 (w/w), at least 400:1 (w/w), at least 500:1 (w/w), at least 600:1 (w/w), at least 700:1 (w/w), at least 800:1 (w/w), at least 900:1 (w/w), at least 1,000:1 (w/w), at least 1,100:1 (w/w), at least 1,200:1 (w/w), at least 1,300:1 (w/w), at least 1,400:1 (w/w), at least 1,500:1 (w/w), at least 2,000:1 (w/w), at least 3,000:1 (w/w), at least 4,000:1 (w/w), or at least 5,000:1 (w/w).

In some embodiments, the antibody:sEng molar ratio in the column is 1.25:1, 2:1, 3:1, 4:1, 5:1, 10:1, 15:1, 20:1, 25:1, 30:1, 50:1, 75:1, 100:1, 125:1, 150:1, 200:1, 250:1, 300:1, 400:1, or 500:1. In some embodiments, the antibody:sEng molar ratio is at least 1.25:1, at least 2:1, at least 3:1, at least 4:1, at least 5:1, at least 10:1, at least 15:1, at least 20:1, at least 25:1, at least 30:1, at least 50:1, at least 75:1, at least 100:1, at least 125:1, at least 150:1, at least 200:1, at least 250:1, at least 300:1, at least 400:1, or at least 500:1.

In other embodiments, for clinical treatments, columns of various dimensions containing 25 to 750 ml of Sepharose beads coupled with anti-sEng antibodies are used to deplete native sEng of various isoforms from blood plasma of patients suffering from diseases associated with high levels of sEng in blood, including pregnancy-related hypertensive disorders like pre-eclampsia, eclampsia, HELLP syndrome, or postpartum hypertension, and non-hypertensive sEng-related disorders.

In some embodiments, the columns contain anti-sEng antibody-coupled Sepharose beads at 0.1-5 mg of antibodies per 1 ml of beads (5-250 mg per 50 ml beads; 0.26-13 billion antibody molecules per single bead), at flow rates of 10-100 ml/min, at linear flow rates of 10-300 cm/hr, and residence times of 0.2-5 minutes. Patients with average weight will have about 8 Liters of blood circulating in their body (about 4 Liters of plasma). In some embodiments, about 0.25-3 times the total body plasma volume (1-12 Liters of plasma), which corresponds to 20 to 240 times the column bed volumes of blood plasma (for a 50 ml column), containing 0.04-0.48 mg of native sEng (for a patient with 40 ng/ml sEng level in plasma) of various forms, are applied to the columns containing anti-sEng antibody-coupled beads at anti-sEng antibody to sEng ratios of 50:1 to 2,000:1 (w/w), or molar ratios of 12.5:1 to 500:1. Under these ranges of conditions, columns containing Sepharose beads coupled with anti-sEng antibodies are expected to deplete 50 to 100% of sEng from plasma of patients with high sEng levels in their blood.

In one embodiment, provided is a method of treating or preventing a disorder associated with sEng, such as a pregnancy-related hypertensive disorder, in a subject in need thereof comprising providing ex vivo to the subject an anti-sEng antibody or sEng-binding fragment thereof, wherein the anti-sEng antibody or sEng-binding fragment thereof is attached to a solid support, and wherein the molar antibody to sEng ratio is 500.

In another embodiment, provided is a method of treating a disorder associated with sEng, such as a pregnancy-related hypertensive disorder, in a subject in need thereof comprising providing ex vivo to the subject an anti-sEng antibody, or sEng-binding fragment thereof, wherein the anti-sEng antibody or sEng-binding fragment thereof is attached to a solid support, and wherein the molar antibody to sEng ratio is 400.

In another embodiment, provided is a method of treating or preventing a disorder associated with sEng, such as a preventing a pregnancy-related hypertensive disorder, in a subject in need thereof comprising providing ex vivo to the subject an anti-sEng antibody, or sEng-binding fragment thereof, wherein the anti-sEng antibody or sEng-binding fragment thereof is attached to a solid support, and wherein the molar antibody to sEng ratio is 250.

In another embodiment, provided is a method of treating or preventing a disorder associated with sEng, such as a pregnancy-related hypertensive disorder, in a subject in need thereof comprising providing ex vivo to the subject an anti-sEng antibody or sEng-binding fragment thereof, wherein the anti-sEng antibody, or sEng-binding fragment thereof, is attached to a solid support, and wherein the molar antibody to sEng ratio is 100.

In still other embodiments, provided are methods of treating or preventing a disorder associated with sEng, such as a pregnancy-related hypertensive disorder, wherein the anti-sEng antibody, or sEng-binding fragment thereof, is attached to a solid support, and the molar antibody to sEng ratio is 50, 25, or 12.5.

In some embodiments, the anti-sEng antibody or sEng-binding fragment thereof depletes at least 70%, or at least 80%, or at least 90%, or at least 95%, or at least 99%, or from 70% to 80%, or from 80% to 90%, or from 90% to 95%, or from 95% to 99% of sEng from human plasma in an in vitro analysis.

In another embodiment, provided is an analysis method, wherein human serum is spiked with sEng. In certain embodiments, the analysis is performed using Sepharose bead-bound anti-sEng antibodies or sEng-binding fragments thereof mixed in sEng-spiked plasma. In certain embodiments, the analysis is performed over a time period that replicates a residence time on a clinical column of 0.25, 0.5, 1, 1.5, 2, 2.5, 3, 4, or 5 minutes. Such an analysis can be performed using a solution of bead-bound anti-sEng antibodies or sEng-binding fragments in a column and sEng-spiked plasma applied at a flow rate to obtain a desired residence time. Alternatively, the analysis could be performed using sEng spiked in amniotic fluid, serum (e.g., horse serum), or a buffer solution (e.g., PBS), but plasma, particularly human plasma, is preferred. The analysis can be performed using anti-sEng antibodies or sEng-binding fragments thereof bound to a column support (e.g., Sepharose beads) at various densities and sEng spiked in plasma at various concentrations. The anti-sEng antibodies or sEng-binding fragments thereof can be linked to Sepharose beads in amounts of 0.025, 0.050, 0.1, 0.25, 0.5, 1, 2, or 5 mg/bead. The volumetric flow rate can be 0.05, 0.1, 0.25, 0.5, 1, 2, 2.5, 5, 10, 25, 50, or 100 ml/min, and linear flow rates can be 10, 20, 30, 50, 75, 100, 150, 180, 240, or 300 cm/hr.

In some embodiments, the sEng antibodies or sEng-binding fragments thereof disclosed herein efficiently deplete sEng in blood or plasma from a subject. The sEng can be soluble and/or in microparticles circulating in the bloodstream. In certain embodiments, when an antibody disclosed herein is attached to a solid support (e.g., Sepharose beads), and contacted with a solution containing sEng such that the antibody to sEng ratio is 50, the sEng antibody depletes (binds to) at least 70%, or at least 80%, or at least 90%, or at least 95% of sEng. In certain embodiments, the sEng antibody depletes from 70% to 80%, of from 80% to 90%, or from 90% to 95%, of from 95 to 99% of sEng. The solution can be blood, plasma, serum, or a buffer solution. In certain embodiments, when an antibody disclosed herein is attached to a solid support (e.g., Sepharose beads), and contacted with a solution containing sEng such that the antibody to sEng ratio is 100, the sEng antibody depletes at least 70%, or at least 80%, or at least 90%, or at least 95% of sEng. In certain embodiments, the sEng antibody depletes from 70% to 80%, of from 80% to 90%, or from 90% to 95%, of from 95 to 99% of sEng. In certain embodiments, when an antibody disclosed herein is attached to a solid support (e.g., Sepharose beads), and contacted with a solution containing sEng such that the antibody to sEng ratio is 250, the sEng antibody depletes at least 70%, or at least 80%, or at least 90%, or at least 95% of sEng. In certain embodiments, the sEng antibody depletes from 70% to 80%, of from 80% to 90%, or from 90% to 95%, of from 95 to 99% of sEng. In certain embodiments, when an antibody disclosed herein is attached to a solid support (e.g., Sepharose beads), and contacted with a solution containing sEng such that the antibody to sEng ratio is 400, the sEng antibody depletes at least 70%, or at least 80%, or at least 90%, or at least 95% of sEng. In certain embodiments, the sEng antibody depletes from 70% to 80%, of from 80% to 90%, or from 90% to 95%, of from 95 to 99% of sEng.

In certain embodiments, the anti-sEng antibody or sEng-binding fragment is capable, under suitable conditions, of reducing the concentration of sEng in the subject's blood or plasma containing sEng to less than about 100 ng/ml, less than about 90 ng/ml, less than about 80 ng/ml, less than about 70 ng/ml, less than about 60 ng/ml, less than about 50 ng/ml, less than about 40 ng/ml, less than about 25 ng/ml, less than about 10 ng/ml, less than about 5 ng/ml, less than about 4 ng/ml, less than about 3 ng/ml, less than about 2 ng/ml, less than about 1 ng/ml, less than about 0.75 ng/ml, or less than about 0.5 ng/ml.

In certain embodiments, an sEng molecule is removed from blood plasma by immobilization to a solid support, for example, using an anti-sEng antibody, or sEng-binding fragment thereof. When sEng is immobilized to a solid support, ligand binding is less favored compared to the case where sEng is free in solution. Accordingly, sEng levels are reduced in the subject, and any reduction of circulating sEng ligand may be insubstantial.

In certain embodiments, provided are methods comprising:
(a) removing blood from the subject,
(b) passing the blood or a component thereof over a solid support to which are attached anti-sEng antibodies, or sEng-binding fragments thereof, or sEng ligands, to decrease the level of sEng in the blood or component thereof, and
(c) returning the blood or component thereof to the subject's body.

In certain embodiments, the blood is separated into plasma and cellular components and only the plasma is contacted with the anti-sEng antibodies, or sEng-binding fragments thereof, while the cellular components are returned to the subject without such contact or, in certain embodiments, disposed of rather than returned to the subject.

Accordingly, in certain embodiments, the method comprises removing a volume of the subject's blood, separating the blood into plasma and cellular components, bringing the plasma into contact with the anti-sEng antibodies, or sEng-binding fragments thereof, to bind sEng in the plasma to the anti-sEng antibodies, or sEng-binding fragments thereof, thereby decreasing the amount of sEng in the subject's plasma, returning the plasma to the subject, and, optionally, returning the cellular components to the subject.

When practicing the above embodiment, the cellular components may be returned to the subject at any time. That is, the cellular components may be returned to the subject before the plasma is contacted with the anti-sEng antibodies, or sEng-binding fragments thereof, or the cellular components may be returned to the subject after the plasma is contacted with the anti-sEng antibodies, or sEng-binding fragments thereof. In certain embodiments, the cellular components may be combined with the plasma after the plasma has been contacted with the anti-sEng antibodies, or sEng-binding fragments thereof, and the combined cellular components and plasma are returned to the subject at the same time, through the same conduit system and/or the same return device.

In certain embodiments, provided are methods for treating and/or preventing a sEng-related disorder, wherein the sEng-related disorder is a pregnancy-related hypertensive disorder. In some embodiments, the pregnancy-related hypertensive disorder is eclampsia, pre-eclampsia, HELLP syndrome, or postpartum hypertension. In certain embodiments, the pregnancy-related hypertensive disorder is pre-eclampsia. In certain embodiments, the pregnancy-related hypertensive disorder is HELLP syndrome.

In certain embodiments, provided are methods for treating and/or preventing a sEng-related disorder, wherein the sEng-related disorder a non-hypertensive sEng-related disorder. In some embodiments, the non-hypertensive sEng-related disorder is chronic kidney disease or systemic sclerosis (scleroderma). sEng levels are typically elevated during the last several weeks of a normal pregnancy, and may not be accompanied by a hypertensive disorder. Accordingly, in some embodiments, the non-hypertensive sEng-related disorder is a non-hypertensive sEng-related disorder of late stage pregnancy and labor. In one embodiment, the non-hypertensive sEng-related disorder of late stage pregnancy and labor is pre-term labor.

In certain embodiments, the subject is a pregnant human, a postpartum human, or a pregnant or postpartum non-human (e.g., a cow, a horse, a sheep, a pig, a goat, a dog, or a cat). In certain embodiments, the subject is a pregnant human or a postpartum human. In certain embodiments, the subject is a pregnant human.

In certain embodiments, the methods disclosed herein may be practiced on a subject who is being treated with standard pre-eclampsia or eclampsia therapies. Such standard therapies are known to the skilled artisan and include the methods described in U.S. Patent Application Publication No. US 2004/0126828; U.S. Patent Application Publication No. US 2005/0025762; U.S. Patent Application Publication No. US 2005/0170444; and U.S. Patent Application Publication No. US 2006/0067937 as well as in International Patent Publication WO 2004/008946; International Patent Publication WO 2005/077007; and International Patent Publication WO 06/034507.

The methods disclosed herein may be practiced using a combination of sEng-binding substances. For example, two or more of anti-sEng antibodies, sEng-binding fragments thereof, and sEng ligands may be used.

The methods disclosed herein may be practiced on a subject who is being treated with chronic hypertension medications. Medications used for the treatment of hypertension during pregnancy include methyldopa, hydralazine hydrochloride, or labetalol.

In certain embodiments, the methods provided herein can further include the step of administering an anti-hypertensive compound to the subject. Such administration may be by conventional means, e.g., administering an oral dosage form comprising an anti-hypertensive compound.

In certain embodiments, the methods provided herein can further include administering a growth factor or cytokine, such as, without limitation, a Vascular Endothelial Growth Factor Receptor (VEGFR) ligand, to the subject. In one embodiment, the growth factor is Vascular Endothelial Growth Factor (VEGF). In another embodiment, the growth factor is Placental Growth Factor (P1GF).

The methods disclosed herein may be practiced during pregnancy for the treatment or prevention of pre-eclampsia or eclampsia or after pregnancy to treat postpartum pre-eclampsia or eclampsia.

"Treating" refers to practicing the ex vivo methods disclosed herein for therapeutic purposes. To "treat" or to use for "therapy" refers to administering treatment to a subject already diagnosed as having or suffering from a pregnancy-related hypertensive disorder to improve the subject's condition. For example, the subject may be diagnosed as having or suffering from pre-eclampsia or eclampsia, based on identification of any of the characteristic symptoms described herein or based on measurement of the concentration of sEng in the subject's blood, as described herein. The object of the treatment is to prevent or slow down (lessen) an undesired physiological condition, disorder or disease, or to obtain beneficial or desired clinical results. For the purposes of this invention, beneficial or desired clinical results include, but are not limited to, alleviation of symptoms; diminishment of the extent of the condition, disorder or disease; stabilization (i.e., not worsening) of the state of the condition, disorder or disease; delay in onset or slowing of the progression of the condition, disorder or disease; amelioration of the condition, disorder or disease state; and remission (whether partial or total), whether detectable or undetectable, or enhancement or improvement of the condition, disorder or disease. Treatment includes eliciting a clinically significant response without excessive levels of side effects. Treatment also includes prolonging survival as compared to expected survival if not receiving treatment.

"Prevent" refers to prophylactic treatment of a subject who is not yet ill, but who is susceptible to, or otherwise at risk for, developing a pregnancy-related hypertensive disorder, e.g., a subject who is determined to be at risk for developing pre-eclampsia or eclampsia.

"Pregnancy-related hypertensive disorder" refers to any condition or disease during pregnancy that is associated with or characterized by an increase in blood pressure. Included among these conditions and diseases are pre-eclampsia (including early-onset pre-eclampsia, late-onset pre-eclampsia, severe pre-eclampsia), eclampsia, gestational hypertension, HELLP syndrome, (hemolysis, elevated liver enzymes, low platelets), placental abruption, chronic hypertension during pregnancy, pregnancy with intra uterine growth restriction (IUGR), and pregnancy with a small for gestational age (SGA) fetus.

"Pre-eclampsia" refers to a multi-system disorder that is characterized by hypertension with proteinuria or edema, or both, glomerular dysfunction, brain edema, liver edema, or coagulation abnormalities due to pregnancy or the influence of a recent pregnancy. All forms of pre-eclampsia, such as early-onset, late-onset, mild, moderate, and severe pre-eclampsia are included in this definition. Pre-eclampsia generally occurs after the 20th week of gestation. Pre-eclampsia is generally defined as some combination of the following symptoms: (1) a systolic blood pressure (BP)>140 mm Hg and a diastolic BP>90 mm Hg after 20 weeks gestation (generally measured on two occasions, 4-168 hours apart), (2) new onset proteinuria (1+ by dipstick on urinalysis, >300 mg of protein in a 24-hour urine collection, or a single random urine sample having a protein/creatinine ratio>0.3), and (3) new-onset hypertension with new-onset of any of the following: thrombocytopenia, renal insufficiency, impaired liver function, pulmonary edema, cerebral/visual symptoms. Severe pre-eclampsia is generally defined as (1) a diastolic BP>110 mm Hg (generally measured on two occasions, 4-168 hours apart) or (2) proteinuria characterized by a measurement of 3.5 grams or more protein in a 24-hour urine collection or two random urine specimens with at least 3+ protein by dipstick. In pre-eclampsia, hypertension and proteinuria generally occur within seven days of each other. In severe pre-eclampsia, severe hypertension, severe proteinuria and HELLP syndrome (hemolysis, elevated liver enzymes, low platelets) or eclampsia can occur simultaneously or only one symptom at a time. HELLP syndrome is characterized by evidence of thrombocytopenia (<100,000 cells/μl), increased LDH (>600 IU/L) and increased AST (>70 IU/L). Occasionally, severe pre-eclampsia can lead to the development of seizures. This severe form of the syndrome is referred to as "eclampsia." Eclampsia can also include dysfunction or damage to several organs or tissues such as the liver (e.g., hepatocellular damage, periportal necrosis) and the central nervous system (e.g., cerebral edema and cerebral hemorrhage). The etiology of the seizures is thought to be secondary to the development of cerebral edema and focal spasm of small blood vessels in the kidney.

"Subject" refers to a mammal, including, but not limited to, a human or non-human mammal such as a baboon, a monkey, a cow, a horse, a sheep, a pig, a goat, a dog, or a cat.

"At risk of developing" a pregnancy-related hypertensive disorder such as pre-eclampsia or eclampsia refers to a subject who does not currently have, but has a greater than average chance of developing, a pregnancy-related hypertensive disorder. Such at-risk subjects include pregnant women with an sEng blood concentration of greater than about 3 ng/ml, greater than about 4 ng/ml, greater than about 5 ng/ml, greater than about 6 ng/ml, greater than about 7 ng/ml, greater than about 8 ng/ml, greater than about 9 ng/ml, greater than about 10 ng/ml, greater than about 15 ng/ml, greater than about 20 ng/ml, greater than about 25 ng/ml, greater than about 30 ng/ml, greater than about 40 ng/ml, greater than about 45 ng/ml, greater than about 60 ng/ml, or greater than about 100 ng/ml, but who show no other signs of a pregnancy-related hypertensive disorder such as pre-eclampsia.

The stage of pregnancy at which the methods described herein may be practiced depends on various clinical factors including the overall health of the subject and the severity of the symptoms of pre-eclampsia. In general, once pre-eclampsia or a predisposition to pre-eclampsia is detected, the methods may be employed. Treatment can be continued for a period of time ranging from 1 to 100 days, more preferably 1 to 60 days, 1 to 10 days, or 1 to 5 days, and most preferably 1 to 20 days.

In certain embodiments, the method is carried out on a subject on or after the 14th week of pregnancy, the 16th week of pregnancy, the 18th week of pregnancy, the 20th week of pregnancy, the 22nd week of pregnancy, the 24th week of pregnancy, the 26th week of pregnancy, the 28th week of pregnancy, the 30th week of pregnancy, the 32nd week of pregnancy, the 34th week of pregnancy, or the 36th week of pregnancy. In certain embodiments, the method is carried out on a subject between the 14th and 16th weeks of pregnancy, the 16th and 18th weeks of pregnancy, the 18th and 20th weeks of pregnancy, the 20th and 22nd weeks of pregnancy, the 22nd and 24th weeks of pregnancy, the 24th and 26th weeks of pregnancy, the 26th and 28th weeks of pregnancy, the 28th and 30th weeks of pregnancy, the 30th and 32nd weeks of pregnancy, the 32nd and 34th weeks of pregnancy, or the 34th and 36th weeks of pregnancy.

In certain embodiments, the subject's blood or plasma is contacted with anti-sEng antibodies or ligands only to the extent necessary to reduce sEng to a desired level. A desired level can be, for example, a level of sEng characteristic of a normal pregnancy. It has been observed that in normal pregnancy, the serum concentration of sEng decreases from 8-12 weeks to 16-20 weeks, gradually increases at 26-30 weeks, rapidly elevates at 35-39 weeks, and returns to normal level after delivery. Accordingly, in one embodiment, the desired level is the normal level for the subject's stage of pregnancy. In another embodiment, the level is higher or lower that the normal level for the subject's stage of pregnancy. One of ordinary skill in the art would be able to determine a desired level, depending for example on the patient and the frequency with which the ex vivo procedure is to be performed.

The desired sEng level can be achieved by controlling, for example, the length of time a subject is treated (i.e., the volume of blood or plasma treated for a particular flow rate), the flow rate over the immobilized antibody or ligand, and/or the binding capacity of the solid support bearing the antibody or ligand that binds to sEng. In one embodiment, a diagnostic is used to measure sEng levels at the time of treatment. In another embodiment, the diagnostic provides a real-time measure of sEng level and treatment is stopped when the desired sEng level is reached. In another embodiment, the time, flow rate, and/or capacity is predetermined based on the sEng level diagnosed in the subject at the start of the procedure and the sEng level desired to be reached.

In certain embodiments, the method decreases blood levels of sEng in the subject by 10%-90%, 20%-80%, or 30%-50%, as compared to the blood levels of sEng in the subject before the method is practiced on the subject. In certain embodiments, the method decreases blood levels of sEng in the subject by 10%-20%, 20%-30%, 30%-40%, 40%-50%, 50%-60%, 60%-70%, 70%-80%, 80%-90%, or 90%-100% as compared to the blood levels of sEng in the subject before the method is practiced on the subject.

In one aspect, provided are systems for treating or preventing an sEng-related disease or disorder.

Provided herein is a system comprising anti-sEng antibodies or sEng-binding fragments thereof bound to a solid support, a first means for conveying blood from a subject to the anti-sEng antibodies or sEng-binding fragments thereof bound to the solid support so as to contact the blood with the anti-sEng antibodies or sEng-binding fragments thereof, and thereby remove sEng from the blood, and second means for conveying the blood to the subject following contact of the blood with the anti-sEng antibodies or sEng-binding fragments thereof.

In certain embodiments of the present invention, plasma, rather than blood, is contacted with anti-sEng antibodies or sEng-binding fragments thereof bound to a solid support, in order to treat or prevent a pregnancy-related hypertensive disorder. Accordingly, in certain embodiments, the first means includes a device for separating the subject's blood into plasma and cellular components.

In certain embodiments, the first and/or second means may also comprise one or more sensors for determining the pressure and/or the flow rate of the blood in the conduit system.

In one aspect, provided is a system comprising:
(a) anti-sEng antibodies or sEng-binding fragments thereof, wherein the anti-sEng antibodies or sEng-binding fragments thereof deplete at least 70%, at least 80%, at least 90%, at least 95%, at least 96%, at least 97%, at least 98%, or at least 99% of sEng from human plasma in an in vitro analysis, wherein the anti-sEng antibodies or sEng-binding fragments thereof are attached to a solid support, and wherein the antibody to sEng molar ratio is 50;
(b) a first means for conveying blood or a component thereof from a subject to the anti-sEng antibodies or sEng-binding fragments thereof bound to the solid support so as to contact the blood or a component thereof with the anti-sEng antibodies or sEng-binding fragments thereof and thereby to remove sEng from the blood or a component thereof; and
(c) a second means for conveying the blood or a component thereof to the subject following contact of the blood or a component thereof with the anti-sEng antibodies or sEng-binding fragments thereof.

In one embodiment, the first means comprises a device for separating the subject's blood into plasma and cellular components. In one embodiment, the device for separating the subject's blood into plasma and cellular components is a centrifuge or an apheresis device.

In one embodiment, the first means comprises
a) an access device, inserted into a blood vessel of the subject, for accessing the subject's blood system; and
b) a conduit system, which fluidly connects the access device to the anti-sEng antibodies, or sEng-binding fragments thereof, bound to the solid support, thereby allowing the subject's blood or a component thereof to flow to and contact the anti-sEng antibodies, or sEng-binding fragments thereof.

In certain embodiments, the first means comprises an access device, such as a catheter, needle, cannula, or the like, inserted into a blood vessel of the subject, for accessing the subject's blood system, a conduit system, such as tubing, piping, hollow fibers, or the like, which fluidly connects the access device to the anti-sEng antibodies or sEng-binding fragments thereof bound to the solid support, thereby allowing the subject's blood to flow to and contact the anti-sEng antibodies or sEng-binding fragments thereof and, optionally, a pump (e.g., a peristaltic pump) or the like, for moving blood from the subject through the access device and conduit system to the anti-sEng antibodies or sEng-binding fragments thereof.

In one embodiment, the second means comprises
a) a conduit system; and
b) a return device, where the return device is inserted into a blood vessel of the subject, and where the conduit system fluidly connects the blood or a component thereof in contact with the anti-sEng antibodies, or sEng-binding fragments thereof, to the return device so as to allow for the return of the blood or a component thereof to the subject.

In certain embodiments, the second means comprises a conduit system, such as tubing, piping, hollow fibers, or the like, and a return device, such as a catheter, needle, cannula, or the like, where the return device is inserted into a blood vessel (e.g., a vein) of the subject, where the conduit system fluidly connects the blood or plasma in contact with the anti-sEng antibodies or sEng-binding fragments thereof, or sEng ligands, to the return device so as to allow for the return of the blood or plasma to the subject. Optionally, the second means also comprises a pump (e.g., a peristaltic pump) or the like, for moving the blood or plasma from the anti-sEng antibodies or sEng-binding fragments thereof, or sEng ligands, through the conduit system to the return device. This pump or the like may be the same pump or the like that is part of the first means or, alternatively, the motive force for the second means for conveying the blood or plasma to the subject may be a separate pump or the like, specific to the second means.

In one embodiment, the system comprises (i) an anti-sEng antibody or sEng-binding fragment thereof disclosed herein and/or (ii) an anti-sEng antibody that competes for binding to sEng with an anti-sEng antibody or sEng-binding fragment thereof disclosed herein.

The anti-sEng antibodies, or sEng-binding fragments thereof, attached to a solid support, can be used to remove sEng from the body fluids of subjects suffering from, or at risk of developing, pre-eclampsia or eclampsia. In certain embodiments, the anti-sEng antibodies, or sEng-binding fragments thereof, attached to a solid support, are used to remove sEng from blood or blood plasma. In certain embodiments, the anti-sEng antibodies, or sEng-binding fragments thereof, attached to a solid support are used in extracorporeal immunoadsorbent devices, which are known in the art. Blood or plasma is exposed to the attached support-bound anti-sEng antibodies, or sEng-binding fragments thereof, resulting in partial or complete removal of circulating sEng (free or in complexes with other blood proteins), following which the blood or plasma is returned to the subject's body. The methods disclosed herein may be implemented in a continuous flow arrangement, with or without interposing a cell removal step, e.g., a centrifugation step, prior to contact of the blood or plasma with the anti-sEng antibodies.

Solid supports for use in the methods described herein preferably should be non-toxic and stable when exposed to blood or blood components. The solid supports may be chosen from among those well known in the art. For example, any suitable porous material may be used as the solid support. Examples of suitable solid supports include, e.g., carbohydrate-based materials such as the various types of SEPHAROSE® (a crosslinked, beaded-form of agarose), e.g., SEPHAROSE 4B®, 4FF®, CL-4B® and CL-6B.

The solid support may be comprised of organic or inorganic molecules, or a combination of organic and inorganic molecules, and may be comprised of one or more functional groups, e.g., hydroxyl groups, suitable for forming covalent bonds with activating agents. The solid support may be comprised of a hydrophilic compound, a hydrophobic compound, or any combination thereof. The solid support may be comprised of a polymer or a copolymer.

Examples of suitable materials for use in solid supports include, but are not limited to, agarose, cellulose, polyether sulfones, polyamides, polysaccharides, polytetrafluoroethylene, polyesters, polyurethanes, polyvinylidene fluoride, polypropylene, fluorocarbons, e.g., poly(tetrafluoroethylene-co-perfluoro(alkyl vinyl ether)), polyethylene, glass, polycarbonates, polyacrylate, polyacrylamide, poly(azolactone), polystyrene, ceramics, and nylon.

The solid support need not be in any particular shape. For example, the solid support may be in the form of beads, membranes, gels, columns, chips, plates, tubes, sheets, fibers, or hollow fibers. The solid support can also be in the form of a coating on the interior of one or more lengths of tubing, piping, or hollow fibers through which blood or plasma flows. In such embodiments, the tubing, piping, or hollow fibers are preferably coiled or otherwise convoluted or bent, in order to maximize the amount of solid support contacted by the blood or plasma flowing through the tubing, piping, or hollow fibers.

Methods of attaching antibodies and ligands to a solid support are well known in the art and may be used to attach the anti-sEng antibodies, or sEng-binding fragments thereof, used in the methods described herein to a solid support. Such methods include, without limitation, the use of cyanogen bromide, 1,1'-carbonyldiimidazole (CDI), or triethylamine.

In general, solid supports may be activated for the attachment of anti-sEng antibodies, or sEng-binding fragments thereof, by contacting the solid supports with an activating agent such as an aldehyde, an epoxide, a cyanogen, or an activated carboxylic acid.

Methods of attaching antibodies to solid supports are well known in the art. See, e.g., Hermanson et al. 1992, Immobilized Affinity Ligand Techniques, Academic Press; U.S. Pat. Nos. 5,874,165; 3,932,557; 4,772,635; 4,210,723; 5,250,6123; European Patent Application EP 1 352 957 A1, and International Patent Publication WO 2004/074471. Typically, the solid support is activated with a reactive functional group such as an epoxide (e.g., by the use of epichlorohydrin), cyanogens (e.g., cyanogen bromide (CNBr)), N,N-disuccinimidylcarbonate (DSC), aldehydes, or an activated carboxylic acid (e.g., N-hydroxysuccinimide (NHS) esters, or carbonyldiimidazole (CDI) activated esters). Activated groups may be attached directly to the solid support, as is generally the case for CNBr, or the activated groups may be part of a linker or spacer molecule, which is typically a linear chain of carbon, optionally substituted with oxygen and/or nitrogen atoms. A typical example of such a linker is the ten membered chain of carbon and oxygen found in the linker butanediol digycidyl ether (a common epoxide coupling agent). The activated solid support is then contacted with the antibody under coupling conditions.

Other linkers may include a branched, unbranched, or cyclic carbon chain comprising from 1 to 30 carbon atoms. In certain embodiments, the linker may be comprised of more than 30 carbon atoms. The linker may comprise at least one hetero-atom such as nitrogen, oxygen, or sulfur.

The commercial product AFFI-GEL 15C) (BioRad, Hercules, Calif.) may be used for linker-assisted coupling. AFFI-GEL 15C) is an agarose support derivatized with an NHS activated carboxylic acid as part of a linker arm containing a positively charged secondary amine. Another charged linker is disclosed in U.S. Pat. No. 5,260,373. A shorter linker arm comprised of arginine may be used to facilitate coupling to an agarose support. The arginine linker is activated with NHS and carries a positive charge.

Anti-sEng antibodies, binding fragments thereof, and sEng specific polypeptides and ligands can be covalently or non-covalently coupled to a solid support in a manner that provides more uniform orientation and efficient sEng-binding. Most methods involve modifying a protein with a unique chemical group at a predefined position, and reacting that group with a complementary group on the solid support. In another embodiment, anti-sEng antibodies, antibody fragments, and ligands are produced with N- or C-terminal linkers capable of being coupled to a solid support. In certain embodiments, polypeptides and ligands are synthesized directly on a solid support.

In one aspect, provided is a housing or chamber such as a column containing anti-sEng antibodies, or sEng-binding fragments thereof, bound to a solid support, where the housing or chamber is suitable for use in treating or preventing a pregnancy-related hypertensive disorder such as eclampsia or pre-eclampsia.

In certain embodiments, the housing or chamber is a column. "Column" refers to a container, chamber, or housing, generally cylindrical in shape, containing a solid support to which anti-sEng antibodies, or sEng-binding fragments thereof, or sEng ligands, can be or have been attached.

In certain embodiments, the column contains a volume of about 0.1 to 5 ml, about 5 ml to 2000 ml, about 10 ml to about 1000 ml, about 50 ml to about 500 ml, or about 200 ml to about 400 ml of anti-sEng antibodies, or sEng-binding fragments thereof, bound to a solid support. In certain embodiments, the column contains a volume of about 0.1 ml, about 1 ml, about 5 ml, about 10 ml, about 25 ml, about 50 ml, about 100 ml, about 200 ml, about 300 ml, about 500 ml, about 750 ml, about 1000 ml, about 1500 ml, or about 2000 ml of anti-sEng antibodies, or sEng-binding fragments thereof, bound to a solid support. In certain embodiments, the column contains one or more anti-coagulant substances, e.g., heparin. In certain embodiments, the interior of the column has been treated in a manner intended to reduce the amount of bacteria, *mycoplasma* and/or viruses in the interior of the column. In certain embodiments, the interior of the column is sterile.

In certain embodiments, the column contains sufficient anti-sEng antibodies, or sEng-binding fragments thereof, bound to a solid support, to remove at least 10 µg, at least 25 µg, at least 50 µg, at least 75 µg, at least 100 µg, at least 150 µg, at least 200 µg, at least 300 µg, at least 400 µg, at least 500 µg, at least 600 µg, at least 700 µg, at least 800 µg, at least 900 µg, at least 1000 µg, at least 1500 µg, or at least 2000 µg of sEng from human blood or plasma. In certain embodiments, the column contains sufficient anti-sEng antibodies, or sEng-binding fragments thereof, bound to a solid support, to remove at least 10 µg to 2000 µg, at least 20 µg to 1000 µg, at least 50 µg to 500 µg, or at least 100 µg to 200 µg of sEng from human blood or plasma.

In one aspect, provided are methods of making a device for treating or preventing a pregnancy-related hypertensive disorder such as eclampsia or pre-eclampsia comprising:
 (a) attaching anti-sEng antibodies, or sEng-binding fragments thereof, to a solid support to produce anti-sEng antibodies, or sEng-binding fragments thereof, bound to a solid support,
 (b) introducing the anti-sEng antibodies, or sEng-binding fragments thereof, bound to the solid support into a housing or chamber such as a column to produce a housing or chamber containing the anti-sEng antibodies, or sEng-binding fragments thereof, bound to the solid support,
 (c) fluidly connecting the housing or chamber containing the anti-sEng antibodies, or sEng-binding fragments thereof, bound to the solid support, to a means for conveying blood or plasma from a subject to the anti-sEng antibodies, or anti-sEng-binding fragments thereof, bound to the solid support,
 (d) fluidly connecting the housing or chamber containing the anti-sEng antibodies, or sEng-binding fragments thereof, bound to the solid support, to a means for conveying the blood or plasma from the anti-sEng antibodies, or sEng-binding fragments thereof, bound to the solid support, to the subject, where the means are connected to the housing or chamber so as to allow for contact of the blood or plasma from the subject with the anti-sEng antibodies, or anti-sEng-binding fragments thereof, bound to the solid support, and thereby remove sEng from the blood or plasma.

In one aspect, provided are methods of making a device for treating or preventing a pregnancy-related hypertensive disorder such as eclampsia or pre-eclampsia comprising modifying a dialysis or apheresis device or system so as to provide the dialysis or apheresis device or system with a housing or chamber such as a column containing anti-sEng antibodies, or sEng-binding fragments thereof, bound to a solid support, so as to allow the dialysis or apheresis device or system to provide for the contact of blood or plasma from a subject with the anti-sEng antibodies, or anti-sEng-binding fragments thereof, bound to the solid support, and thereby remove sEng from the blood or plasma to produce sEng-depleted blood or plasma.

In certain embodiments, provided are methods of identifying an anti-sEng antibody suitable for use in ex vivo methods of treating or preventing a pregnancy-related hypertensive disorder such as eclampsia or pre-eclampsia comprising:
 (a) obtaining an antibody that binds to sEng;
 (b) attaching the antibody that binds to sEng to a solid support to produce a solid support comprising bound anti-sEng antibody;
 (c) determining if the solid support comprising bound anti-sEng antibody can bind sEng in a fluid sample from a subject and thereby remove sEng from the fluid sample;

where if the solid support comprising bound anti-sEng antibody can bind sEng in a fluid sample from a subject and thereby remove sEng from the fluid sample, the antibody of step (a) is identified as an anti-sEng antibody suitable for use in ex vivo methods of treating or preventing a pregnancy-related hypertensive disorder such as eclampsia or pre-eclampsia.

In certain embodiments, the subject is a mammal. In certain embodiments, the subject is a human.

In certain embodiments, the fluid sample is blood, plasma, amniotic fluid, or urine.

A modified dialysis or apheresis system can be used to practice the methods disclosed herein, wherein the modified dialysis or apheresis system provides the means by which blood is removed, passed over a solid support containing bound anti-sEng antibodies, or sEng-binding fragments thereof, and returned to the subject's body following removal of sEng from the blood by the anti-sEng antibodies, or sEng-binding fragments thereof. In some embodiments, the apheresis system is a plasmapheresis system and plasma rather than blood is passed over a solid support containing bound anti-sEng antibodies, or sEng-binding fragments thereof, and returned to the subject's body following removal of sEng from the plasma by the anti-sEng antibodies, or sEng-binding fragments thereof.

In certain embodiments, the methods disclosed herein may be carried out using a modified version of a device known in the art that enables removal and extracorporeal treatment of a body fluid such as whole blood or plasma. One such device is a dialysis machine. Dialysis machines are in routine use and methods to control blood flow, remove air bubbles, and maintain proper electrolyte balance, blood sugar, oxygenation, temperature, sterility, and other vital factors during dialysis, are well known and established in the art. In certain embodiments, the methods disclosed herein may be carried out using existing dialysis systems where the dialyzer is replaced by a housing or chamber, such as a column, containing a solid support to which anti-sEng antibodies, or sEng-binding fragments thereof, are attached. When blood flows through the housing or chamber, the anti-sEng antibodies, or sEng-binding fragments thereof, remove sEng from the blood, thereby lowering the concentration of sEng in the blood and treating or preventing a pregnancy-related hypertensive disorder such as pre-eclampsia or eclampsia.

Another well-known device that can be used to practice the methods described herein is an apheresis system, e.g., a plasmapheresis system. Plasmapheresis involves the extracorporeal manipulation and removal of certain cellular components of the blood, after which the blood is re-infused into the subject to induce a desired clinical effect. During plasmapheresis, blood is initially taken out of the body through an access device such as a needle or catheter. Plasma is then removed from the blood by a cell separator. Three procedures are commonly used to separate the plasma from blood cells: (1) Discontinuous flow centrifugation, where, typically, a 300 ml volume of blood is removed at a time and centrifuged to separate plasma from blood cells. (2) Continuous flow centrifugation, where centrifugation is used to continuously spin out plasma. (3) Plasma filtration, where the plasma is filtered using standard hemodialysis equipment.

Apheresis devices suitable for modification for use in the methods disclosed herein are described, e.g., in U.S. Pat. Nos. 5,098,372; 5,112,298; and 6,319,471. Other suitable devices include the LIFE-18® plasma therapy device from PlasmaSelect (Munich, Germany), the Diapact® CRRT from B. Braun (Melsungen, Germany), the COBE SPECTRA®, a product of Cobe BCT, Incorporated, 1201 Oak Street, Lakewood, Co. 80215, and the ELUTRA® Cell Separation System of Gambro BCT, Inc.

In certain embodiments of the systems disclosed herein, the access device for accessing a subject's blood system and/or the return device for returning blood, plasma, or cellular components of blood to a subject is a single lumen catheter or a double lumen catheter such as, e.g., the single lumen or double lumen catheters sold by Fresenius Medical Care (Bad Homburg, Germany). Such catheters may be made of thermosensitive polyurethane that adapts to the contour of a blood vessel as the polyurethane heats to body temperature.

In certain embodiments of the methods disclosed herein, removing blood from the subject includes removing an amount of blood from the subject sufficient to derive at least about 300 milliliters of plasma from the blood. In certain embodiments, removing the blood from the subject includes removing at least 650 milliliters of blood from the subject. In certain embodiments, removing the blood from the subject includes removing at least two liters of blood from the subject. In certain embodiments, removing the blood from the subject includes continuously removing blood from the subject until substantially the entire blood volume of the subject is contacted with anti-sEng antibodies, or sEng-binding fragments thereof, at least once, at least twice, or at least three times. In certain embodiments, removing the blood from the subject includes continuously removing blood from the subject until about two-thirds, about half, about one-fourth, about one-fifth, or about one-tenth of the entire blood volume of the subject is contacted with anti-sEng antibodies, or sEng-binding fragments thereof. In certain embodiments, removing the blood from the subject includes continuously removing blood from the subject until the concentration of sEng in the subject's blood reaches a preselected concentration. In certain embodiments, the preselected concentration is less than about 50 ng/ml, less than about 40 ng/ml, less than about 25 ng/ml, less than about 10 ng/ml, less than about 5 ng/ml, less than about 4 ng/ml, less than about 3 ng/ml, less than about 2 ng/ml, less than about 1 ng/ml, less than about 0.75 ng/ml, or less than about 0.5 ng/ml. In certain embodiments, the preselected concentration is about 40-50 ng/ml, about 30-40 ng/ml, about 20-30 ng/ml, about 10-20 ng/ml, about 5-10 ng/ml, about 5-8 ng/ml, about 3-7 ng/ml, about 1-5 ng/ml, about 1-3 ng/ml, about 0.75-2 ng/ml, or about 0.5-1 ng/ml.

The sEng concentration can be measured automatically in blood or plasma, either continuously, or at preset intervals. For example, plasma samples from the subject can be reacted with a labeled reagent that binds to sEng or particles containing sEng and the amount of sEng measured. Alternatively, a sensor with a linked reagent that specifically binds to sEng (including particles containing sEng) can be used to continuously detect the amount of bound sEng. The blood filtration procedure is terminated when the concentration of sEng detected in a subject's blood or plasma drops below a predetermined value.

Diagnostic methods known in the art can be used to monitor a subject's pre-eclampsia or eclampsia during therapy to determine the effectiveness of therapy according to the methods disclosed herein. Suitable diagnostic methods are disclosed in, e.g., U.S. Pat. Nos. 7,335,362; 7,435,419; and 7,407,659.

In certain embodiments, diagnostic methods are employed that determine and/or monitor the concentration of sEng in a subject's blood in order to identify subjects suitable for treatment or prevention using the methods disclosed herein. In certain embodiments, diagnostic methods are employed to identify subjects at risk of developing a pregnancy-related hypertensive disorder such as pre-eclampsia or eclampsia where the subjects are pregnant women with an sEng blood concentration of greater than about 15 ng/ml, greater than about 20 ng/ml, greater than about 25 ng/ml, greater than about 30 ng/ml, greater than about 40 ng/ml, or greater than about 45 ng/ml, greater than about 60 ng/ml, or greater than about 100 ng/ml, but who show no other signs of a pregnancy-related hypertensive disorder such as pre-eclampsia.

Accordingly, provided is a method of identifying a subject having, or at risk of developing, a pregnancy-related hypertensive disorder and then practicing the ex vivo methods disclosed herein on the subject so identified, thereby treating or preventing the pregnancy-related hypertensive disorder. In certain embodiments, a pregnant human is identified as a subject suitable for treatment or prevention by the methods disclosed herein if the concentration of sEng in the subject's blood during the second trimester of pregnancy is determined to be above about 3.5 ng/ml, above about 4 ng/ml, above about 5 ng/ml, above about 7.5 ng/ml, above about 10 ng/ml, above about 20 ng/ml, above about 30 ng/ml, above about 40 ng/ml, or above about 50 ng/ml.

In certain embodiments where the subject's blood levels of sEng are determined and/or monitored, the methods described herein may be employed until the concentration of sEng in the subject's blood is less than about 50 ng/ml, less than about 45 ng/ml, less than about 40 ng/ml, less than about 35 ng/ml, less than about 30 ng/ml, less than about 25 ng/ml, less than about 20 ng/ml, less than about 15 ng/ml, less than about 10 ng/ml, less than about 7.5 ng/ml, less than about 5 ng/ml, less than about 4 ng/ml, less than about 3 ng/ml, less than about 2 ng/ml, less than about 1.5 ng/ml, or less than about 1 ng/ml.

In certain embodiments, the methods disclosed herein may be employed until an improvement is detected in the symptoms of a pregnancy-related hypertensive disorder. In certain embodiments, the pregnancy-related hypertensive disorder is pre-eclampsia and the improvement is a decrease in blood pressure to a value of less than 140 mmHg (systolic) and/or less than 90 mmHg (diastolic).

It is to be understood that this invention is not limited to the particular molecules, compositions, methodologies, or protocols described, as these may vary. Any methods and materials similar or equivalent to those described herein can be used in the practice or testing of embodiments of the present invention. It is further to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes those possibilities).

All other referenced publications are incorporated herein by reference in their entirety. Furthermore, where a definition or use of a term in a reference, which is incorporated by reference herein is inconsistent or contrary to the definition of that term provided herein, the definition of that term provided herein applies and the definition of that term in the reference does not apply.

To facilitate a better understanding of the present invention, the following examples of specific embodiments are given. The following examples should not be read to limit or define the entire scope of the invention.

EXAMPLES

Example 1: Generation of a Murine, Monoclonal, Anti-sEng Antibody

Mouse anti-human sEng monoclonal antibodies were generated against human, soluble Endoglin (sEng).

Immunization and Selection of Clonal Hybridoma Cell Lines

Mice were initially immunized with antigen recombinant human (rh) Endoglin and Complete Freund's Adjuvant (CFA), followed by three additional booster injections with the antigen and Incomplete Freund's Adjuvant (IFA). The splenocytes from mice that showed high sera titers were fused with a murine myeloma cell line to produce anti-sEng producing hybridoma cells. The hybridoma culture supernatants were screened in a solid-phase enzyme-linked immunosorbent assay (ELISA), in which plates were coated with rh sEng/Fc fusion protein. Anti-sEng antibodies in the samples were detected by horseradish peroxidase (HRP)-conjugated goat anti-mouse IgG detection antibody. The selected positive clones from fusion screens were subcloned two or more rounds, in which culture supernatants were screened using the described solid-phase ELISA. Based on the supernatant IgG titers and sEng-binding affinity measurements by Octet Bio-Layer Interferometry (BLI), sixteen subcloned cell lines (MAb 201 to MAb 216) were selected for further processing.

Production of Ascites and Purification of Anti-sEng Antibodies

The sixteen hybridoma cell lines were thawed, grown to $6 \times 10^6$ cells/ml and injected into mice for ascites production. For each hybridoma cell line, $3 \times 10^6$ cells in 0.5 ml volume were injected into each of five female BALB/c mice. Five to seven days after cell injection ascites were collected, delipidated and frozen.

For antibody purification, the ascites were thawed and applied to a 1 ml Protein-G chromatography column, eluted with low pH buffer and neutralized with Tris buffer, after which the eluate was buffer-exchanged into PBS buffer. The protein concentrations were determined by A280 nm absorbance with Protein Extinction coefficient E (0.1%) 280 nm=1.35. The sixteen isolated anti-sEng antibody clones are referred to below as MAb 201 to MAb 216.

Example 2: sEng Depletion of Anti-sEng MAbs on Protein-G Sepharose

Figure 2:
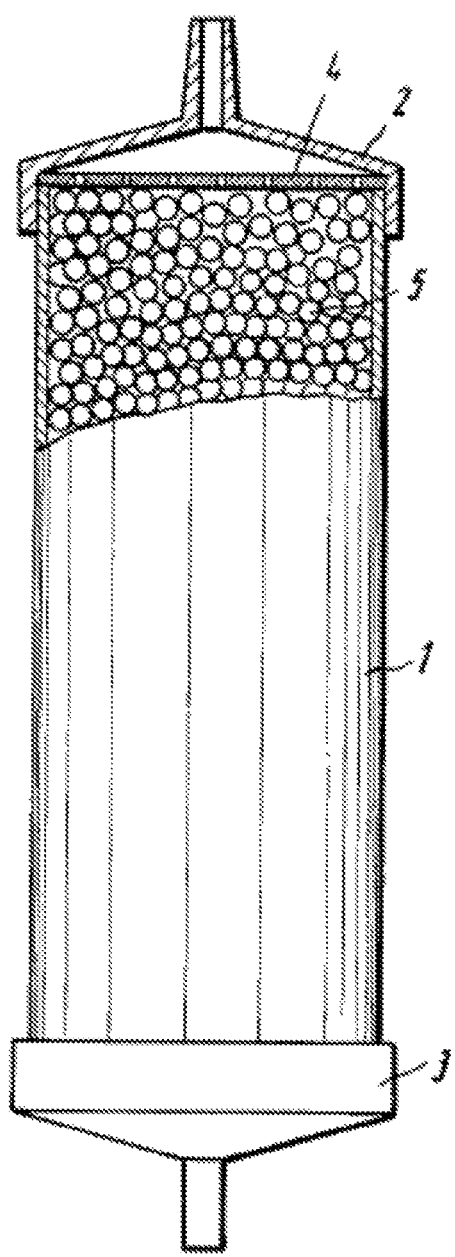
FIG. 2 shows one embodiment of a column comprising anti-sEng antibodies or sEng-binding fragments thereof bound to a solid support. The column comprises a cylindrical housing 1 and two connecting caps 2 and 3, where cap 2 is connected to a means for delivering blood or plasma from a subject to the anti-sEng antibodies or sEng-binding fragments thereof bound to the solid support, and cap 3 is connected to a means for returning the sEng-depleted blood or plasma to the subject following contact of the blood or plasma with the anti-sEng antibodies, or sEng-binding fragments thereof, bound to the solid support. Upper disk 4 is a fluid-permeable barrier (e.g., a filter). Disk 4 allows passage of blood or plasma and is inserted into cap 2, which keeps the solid support 5 away from the inlet opening. A similar disk is present in lower cap 3 but is not shown. Solid support 5 is depicted here in the form of beads, but may be any convenient shape. The anti-sEng antibodies are not shown, but are bound to solid support 5. 1, 2, 3, and 4 are made of blood compatible synthetic materials and are interconnected by conventional techniques.

For apheresis treatment, an Immunoabsorption device column can be integrated into an apheresis instrument (exemplified in FIG. 1) that separates plasma from cell components, directs plasma through the dual device column, and after removing excess sEng, recombines plasma with cells and returns treated blood to patient circulation. To demonstrate that anti-sEng antibodies can be used to effectively remove sEng from solution, anti-sEng antibody/Protein-G columns were generated (see FIG. 2). Binding to Protein-G beads is a simple way to non-covalently conjugate the antibodies onto a solid phase and orient the antibodies in such a way to make the antigen binding regions accessible to the target protein.

Nineteen 1 ml Protein-G columns (sixteen columns for MAbs 201 to 216 and three columns for controls (polyclonal anti-sEng antibody, mouse anti-human Flt-1 antibody, and beads alone, respectively) were washed with 10 column volumes (CV) of phosphate buffered saline (PBS) buffer. 1 ml of 80 ng/ml sEng ("Input") was applied in 1% bovine serum albumin (BSA) to each column. Samples passed through columns by gravity flow. After one passage over the column, the flow-through ("FT") solutions were collected. The sEng amounts before (Input) and after (FT) passing through the column were measured by ELISA. The % sEng depleted was calculated by the following formula:

$$(sEng_{Input} - sEng_{FT})/sEng_{Input}$$

The assay was repeated using ratios of 1, 0.2, 0.05 and 0.01 mg antibody per ml beads using new Protein-G beads.

Control column devices containing (i) beads only, with no antibody attached, or (ii) an anti-Flt-1 antibody did not remove sEng protein from the test solution. At ratios of 1 or 0.2 mg antibody per ml beads, sEng depletion activities for all anti-sEng antibodies tested except (211) were high and were not differentiable. At lower ratios of 0.05 mg and 0.01 mg antibody per ml beads, sEng depletion activities began to differentiate among the tested anti-sEng antibodies. sEng depletion activities for the anti-sEng antibodies tested varied over a wide range (17% to 95%), see Table 1. Anti-sEng antibodies MAb 201, 202, 204, 206, and 210 depleted >90% of sEng.

This experiment demonstrates that anti-sEng antibodies non-covalently bound to a solid support were able to specifically remove sEng from a test solution.

TABLE 1

Soluble Endoglin (sEng) depleted by MAb-Protein-G device columns. Purified anti-sEng antibodies were non-covalently bound to Protein-G Sepharose at 0.01 mg MAb to 1 ml beads ratio. The 0.1 ml columns were tested for removal of 10 CV of 80 ng/ml sEng spiked into PBS + 1% BSA solution. The polyclonal anti-sEng antibody served as a positive control (+). Columns with a mouse anti-human Flt-1 antibody and only mock-conjugated beads, respectively, served as a negative controls (−). Antibodies marked with $ were specific for the ZP domain of sEng (see Example 3). Antibodies marked with * were further analyzed using covalently conjugated antibody device columns (see Example 4). Antibodies MAb 214 and 215 had the weakest relative binding affinity in the original screen (see Example 1).

| Anti-human sEng antibody | % sEng depleted |
|---|---|
| MAb 201* | 96% |
| MAb 206* | 95% |
| MAb 210* | 95% |
| MAb 204* | 92% |
| MAb 202$ | 90% |
| MAb 208* | 87% |
| MAb 213* | 87% |
| Polyclonal anti-human sEng antibody (+) | 84% |
| MAb 216$ | 77% |
| MAb 209* | 73% |
| MAb 212* | 72% |
| MAb 203$ | 69% |
| MAb 214 | 64% |
| MAb 207* | 53% |
| MAb 215 | 47% |
| MAb 205* | 37% |
| MAb 211* | 17% |
| Anti-human Flt-1 antibody (−) | 9% |
| Beads (−) | 7% |

Example 3: Determination of Binding Epitopes for Anti-sEng MAbs

It is thought that some or all endogenous sEng proteins in circulation in pre-eclampsia patients are truncated at the ZP domain. As such, anti-sEng antibodies binding to the ZP domain of sEng might not be able to efficiently deplete sEng from patient circulation. Therefore, the binding of MAbs 201-216 to different sEng domains was tested using a sandwich ELISA.

Fragments of sEng, as well as the full length ectodomain of sEng (FL), were expressed in HEK-293 cells and purified, see Table 2. 96-well microtiter plate wells were coated overnight at RT with 100 μl of purified antibodies MAb 201-216 (2 μg/ml) or monoclonal anti-Endoglin antibody DY1097 (2 μg/ml) as a control. After washing with PBS-T (PBS with 0.05% Tween 20, pH 7.4), plates were blocked with 200 μl blocking buffer for 2 hours at RT and washed with PBS-T. Different fragments of sEng (see Table 2) in blocking buffer were added to the wells, incubated for 2 hrs at RT and then washed with PBS-T. 100 μl of biotinylated polyclonal detection antibody BAF1097 was added in blocking buffer and incubated for 2 hrs at RT. After a wash with PBS-T, 100 μl of streptavidin-HRP in PBS-T was added for detection and incubated for 30 minutes at RT. After a wash with PBS-T, 100 μL of 3,3',5,5'-Tetramethylbenzidine (TMB) substrate was added to each well and incubated for 5 minutes. The reaction was stopped by the addition of 100 μl TMB Stop solution. Absorbance was read at 450 nm and wavelength correction was read at 540 nm using a Spectramax i3×plate reader.

TABLE 2 sEng constructs tested for binding to MAbs 201-216

| sEng constructs | sEng residues |
|---|---|
| Orphan domain | 26-337 |
| Zona Pellucida (ZP) domain | 336-586 |
| Full length ectodomain | 26-586 |

Figure 3C:
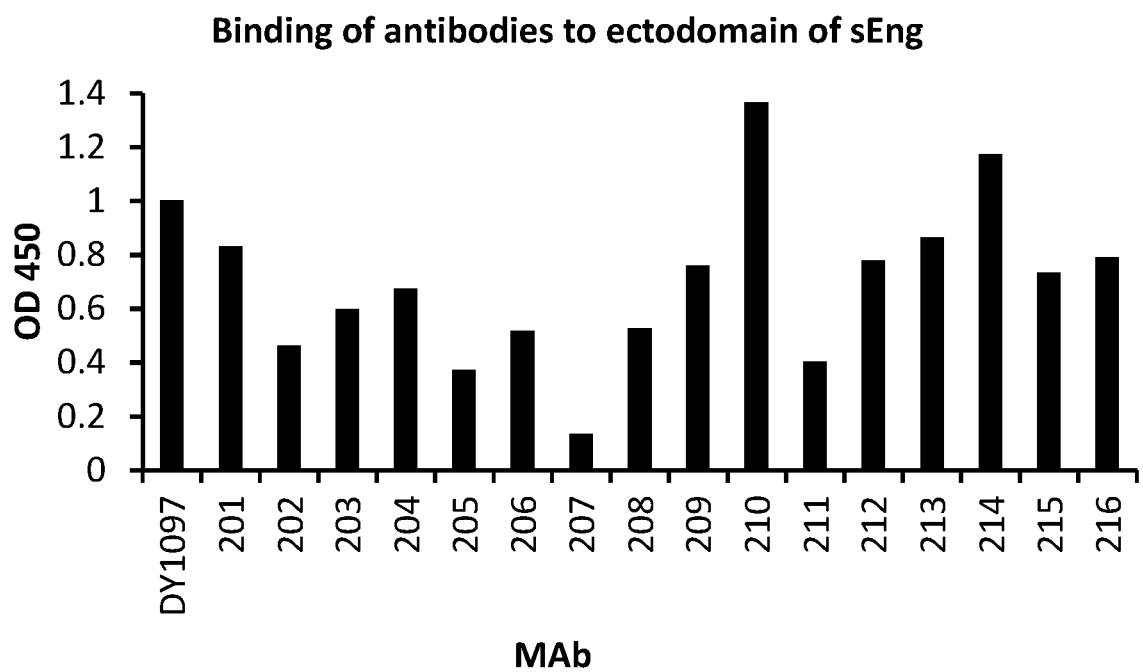

As shown in FIG. 3, MAbs 202, 203 and 216 were specific for the ZP domain of sEng and as such excluded from further analysis. Eleven anti-sEng antibodies, which bound to the orphan domain of sEng and were able to specifically remove sEng from a test solution, were selected for further studies.

Example 4: Depletion of sEng by Anti-sEng MAbs Immobilized on CNBr-Agarose Beads Next, the ability of covalently immobilized anti-sEng antibodies to effectively remove sEng from solutions was examined.

A device for removing sEng from a biological solution was made by attaching anti-sEng antibodies to a solid phase matrix (agarose beads). The agarose beads were chemically treated with cyanogen bromide (CNBr) to create a reactive chemical group on the beads. These activated beads were then mixed with antibody to covalently attach the antibodies to the beads.

For the conjugation step, 0.2 mg/ml of each antibody was prepared in PBS buffer, CNBr-activated Sepharose 4 FF (1 g for every 3.5 ml beads) were hydrated with 20 volumes (20 ml per ml beads) of cold 1 mM HCl. Swelled beads were washed 3 times with 10 volumes (10 ml per ml beads) of cold 1 mM HCl, and then 5 times with 10 volumes of PBS and resuspend with PBS to make slurry.

To initiate conjugation, an anti-sEng antibody was added to the beads and incubated for ~1 hr while shaking. Unbound solution was removed and conjugation evaluated by measuring pre- and post-conjugation solutions by A280 nm and SDS-PAGE. Conjugated beads were washed 5 times with 10 volumes of PBS. Unoccupied sites on the beads were blocked by adding 5 volumes of 0.1 M Tris-HCl pH 8.0 and blocking for 2 hrs. Beads were washed 5 times with 10 volumes of PBS, and then washed alternately with 10 volumes of low pH buffer (0.1M Sodium Acetate pH 4.0+ 0.5M NaCl), followed by 10 volumes of high pH buffer (0.1M Tris-HCl pH 8.0+0.5M NaCl), for 5 times total. Beads were resuspended with PBS to make a 20% slurry.

For the sEng depletion experiment, beads were packed into 0.1 ml columns by gravity and washed 3 times with 10 volumes of PBS. One ml of 80 ng/ml sEng (Input) in 1% BSA was applied to columns. Samples passed through the columns by gravity flow. After one passage over the column, the flow-through (FT) solutions were collected. The sEng amounts before (Input) and after (FT) passing through the column were measured by ELISA. The % sEng depleted was calculated according to the following formula:

$$(\text{sEng}_{Input} - \text{sEng}_{FT})/\text{sEng}_{Input}$$

A subset of the anti-sEng antibodies used in the Protein-G depletion experiments were re-evaluated for sEng depletion after covalent immobilization of the antibodies on CNBr-activated Sepharose matrix (see antibodies marked with * in Table 1). Even when covalently bound to the solid support, anti-sEng antibodies MAb 201, 204, 206, and 210 were very effective in removing sEng from solutions (see Table 3). In contrast, control column devices containing (i) beads only, with no antibody attached, or (ii) an anti-Flt-1 antibody did not remove sEng protein from the test solution.

This experiment demonstrated that anti-sEng antibodies covalently bound to a solid support were able to specifically remove sEng from a test solution.

TABLE 3

% sEng depleted by covalently conjugated anti-sEng antibody device columns. Purified MAbs against human sEng were covalently coupled to CNBr-activated Sepharose 4FF beads at 0.05 mg MAb to 1 ml beads ratio. The 0.1 ml columns were tested for removal of 10 column volumes (CV) of 80 ng/ml sEng spiked into PBS + 1% BSA solution. The polyclonal anti-sEng antibody served as a positive control (+). Columns with a mouse anti-human Flt-1 antibody and only mock-conjugated beads, respectively, served as negative controls (−).

| Anti-human sEng antibody | % sEng depleted |
| --- | --- |
| MAb 201 | 93% |
| MAb 206 | 90% |
| MAb 210 | 88% |
| MAb 204 | 85% |
| MAb 208 | 71% |
| MAb 209 | 63% |
| MAb 207 | 55% |
| MAb 213 | 55% |
| Polyclonal anti-human sEng antibody (+) | 55% |
| MAb 205 | 46% |
| MAb 212 | 38% |
| MAb 211 | 27% |
| Beads (−) | 24% |
| Anti-human Flt-1 antibody (−) | 13% |

Example 5: Depletion of Endogenous sEng from Patient Serum

The anti-sEng antibodies leading to the highest levels of sEng depletion in Examples 2 and 4 (i.e. anti-sEng antibodies MAb 201, 204, 206, and 210 and an additional lower-performing antibody for comparison (MAb 205)) were tested for their ability to remove endogenous sEng from the pooled serum from pre-eclampsia patients.

For the depletion experiment, beads (0.05 mg antibody per ml beads) were packed into 0.1 ml columns by gravity and washed 3 times with 10 volumes of PBS. One ml of pooled pre-eclampsia sera was applied to each column. Samples were allowed to pass through the columns by gravity flow. After one passage over the column, the flow-through (FT) solutions were collected. sEng amounts before (Input) and after (FT) passing through the column were measured by ELISA. The % sEng depleted was calculated according to the following formula:

$$(\text{sEng}_{Input} - \text{sEng}_{FT})/\text{sEng}_{Input}$$

Anti-sEng antibodies MAb 201, 204, 206, and 210 depleted >60% of endogenous sEng from patient serum while the lower-performing antibody 205 depleted ~40% of endogenous sEng (see Table 4). Polyclonal anti-sEng antibodies coupled at this ratio only depleted 10% of endogenous sEng, possibly due to only a fraction of the antibodies being able to bind to available epitopes on the endogenous sEng species present in patient serum. As expected, the negative control columns depleted <5% of endogenous sEng.

This experiment demonstrated that anti-sEng antibodies covalently bound to a solid support were able to specifically remove endogenous human sEng from the serum of a patient with pre-eclampsia. Further, these results show that devices comprising anti-sEng antibodies bound to a solid support can be used to treat pregnancy-related hypertensive disorders, including pre-eclampsia, eclampsia and HELLP syndrome.

TABLE 4

% sEng depleted from pre-eclampsia serum by covalently conjugated anti-sEng antibody device columns. Purified MAbs against human sEng were covalently coupled to CNBr-activated Sepharose 4FF beads at 0.05 mg MAb to 1 ml beads ratio. The polyclonal anti-sEng antibody served as a control. Columns with a mouse anti-human Flt-1 antibody and only mock-conjugated beads, respectively, served as negative controls (−).

| Anti-human sEng antibody | % endogenous sEng depleted |
| --- | --- |
| MAb 204 | 70% |
| MAb 210 | 69% |
| MAb 201 | 65% |
| MAb 206 | 60% |
| MAb 205 | 40% |
| Polyclonal anti-human sEng antibody | 11% |
| Beads (−) | 5% |
| Anti-human Flt-1 antibody (−) | −1% |

TABLE 5

Comparison of sEng-binding affinities of anti-sEng antibodies in hybridoma supernatants. The dissociation constants ($K_d$) of sEng-binding affinities for the indicated anti-sEng antibodies were measured by BLI.

| Anti-human sEng antibody (hybridoma supernatant) | $K_d$ (M) |
| --- | --- |
| MAb 210 | 6.1E−10 |
| MAb 209 | 1.0E−09 |
| MAb 212 | 1.6E−09 |
| MAb 201 | 1.7E−09 |
| MAb 206 | 1.8E−09 |
| MAb 213 | 1.9E−09 |
| MAb 203 | 2.0E−09 |
| MAb 207 | 2.0E−09 |
| MAb 202 | 2.0E−09 |
| MAb 204 | 2.3E−09 |
| MAb 208 | 2.6E−09 |
| MAb 205 | 2.7E−09 |
| MAb 214 | 2.7E−09 |
| MAb 216 | 2.8E−09 |
| MAb 211 | 3.4E−09 |
| MAb 215 | 4.3E−09 |

Example 6: Binding Affinities of Anti-sEng Antibodies to sEng

The sEng-binding affinity of monoclonal antibodies in hybridoma culture supernatants and of purified antibodies was measured by bio-layer interferometry (BLI).

Binding Affinities of Anti-sEng Antibodies Present in Hybridoma Culture Supernatants Materials: Kinetics buffer—PBS solution containing 0.1% BSA and 0.05% Tween-20 was used as the kinetics buffer. Test samples—culture supernatants from top 21 hybridoma clones with the strongest signals for binding to the sEng-Fc antigen as determined by ELISA. sEng antigen—recombinant human (rh) Endoglin ectodomain (residues 1-586) fused with human IgG1 Fc, diluted to 170 nM (30 ug/ml) with kinetics buffer. Biosensors—streptavidin biosensors, preloaded with biotinylated sheep anti-mouse IgG.

Binding affinities were determined using the ForteBio label-free Octet QK BLI system using the following protocol:
  i. Condition: Immerse biosensor tips in 200 uL of kinetics buffer for >10 min.
  ii. Baseline 1: Immerse biosensors in fresh culture medium for 1 min.
  iii. Load: Immerse biosensors in culture supernatant samples containing MAbs for 3 min.
  iv. Baseline: Immerse biosensors in kinetics buffer for 1 min.
  v. Binding/Association: Incubate biosensors with sEng-Fc Antigen for 5 min.
  vi. Dissociation: Incubate biosensors in kinetics buffer for 5 min.

Response signals (nm shifts) were used to calculate $K_d$ values for the different antibodies.

Among the antibodies tested, anti-sEng antibodies MAb 209 and 210 had the lowest $K_d$ values (i.e. highest sEng-Fc binding affinity), see Table 5.

Binding Affinities of Purified Anti-sEng Antibodies

Materials: Kinetics buffer—PBS solution containing 0.1% BSA and 0.05% Tween-20. Anti-sEng antibodies were purified from ascites of mice injected with hybridoma cells by Protein-G chromatography and buffer exchanged into PBS. For each run, 22 ug/ml (or 150 nM) of each antibody was loaded onto the Protein-G biosensor tip. Purified sEng antigen recombinant human (rh) Endoglin ectodomain (residues 1-586) containing C-terminal 6×His tag was purified from HEK-293 cells by metal affinity chromatography followed by size-exclusion chromatography pre-equilibrated in PBS. For each run, 3 ug/ml (or 50 nM) of sEng was used for association to MAbs bound to Protein-G biosensor tips. Protein-G Biosensor tips were purchased from the instrument supplier.

Binding affinities were determined using the ForteBio label-free Octet QK BLI system using the following protocol:
  i. Condition: Immerse biosensor tips in 200 uL of kinetics buffer for >10 min.
  ii. Baseline 1: Immerse biosensors in kinetics buffer for 0.5 min.
  iii. Load: Immerse biosensors in purified MAb for 2 min.
  iv. Baseline 2: Immerse biosensors in kinetics buffer for 0.5 min.
  v. Binding/Association: Incubate biosensors with purified sEng antigen for 5 min.
  vi. Dissociation: Incubate biosensors in kinetics buffer for 5 min.

Response signals (nm shifts) were used to calculate $K_d$ values for the different antibodies.

Antibody MAb 210 had the lowest $K_d$ (i.e. highest sEng-Fc binding affinity), see Table 6. Antibodies 201, 206 and 216 exhibited $K_d$ values of 3 to 4 nM. Antibody 204 had higher $K_d$ of ~14 nM. The remaining antibodies did not result in sufficiently high signals to calculate $K_d$ values. There was no direct correlation between antibody affinity (as measured by BLI, see Tabled 4 and 5) and effectiveness (see Tables 1-3) in the device.

This data demonstrates that anti-sEng antibody MAb 210 has a strong sEng-binding affinity combined with effective sEng depletion activity. Accordingly, this antibody was selected as the lead antibody.

TABLE 6

Comparison of sEng-binding affinities of purified anti-sEng antibodies. The dissociation constants ($K_d$) of sEng-binding affinities for the indicated anti-sEng antibodies were measured by BLI.

| Purified anti-human sEng antibody | $K_d$ (M) |
| --- | --- |
| MAb 210 | 2.2E−09 |
| MAb 206 | 3.0E−09 |
| MAb 201 | 3.6E−09 |
| MAb 216 | 3.8E−09 |
| MAb 204 | 1.4E−08 |

Example 7: Cloning and Purification of the Chimeric Anti-sEng Antibody cENG10

The chimeric monoclonal antibody cENG10 was produced based on the murine anti-sEng antibody MAb 210 and contained murine variable regions and human IgG1 constant regions.

Extraction of cENG10 mRNA and Cloning of cDNA

The total RNA extracted from hybridoma cells expressing the lead antibody MAb 210 was used as template for reverse transcription using antibody cloning primers to clone the variable heavy and light chain regions ($V_H$ and $V_L$). Multiple preparations of cDNAs were sequenced to ensure that the nucleotide sequences of the variable regions were correct. In addition, 5′-RACE cloning was carried out to determine the nucleotide sequences of the secretion signal peptide and the N-terminal ends of the variable regions. Edman degradation was performed to confirm the N-terminal protein residues of the secreted antibody heavy and light chains. The antibody framework and CDR regions were identified and analyzed. A summary of the CDR sequences for anti-sEng antibodies MAb 210 and cENG10 is provided in Table 7.

Nucleotide sequence of MAb 210 and chimeric anti-sEng antibody cENG10 variable domain of heavy chain ($V_H$) (without leader sequence)—SEQ ID NO:1.

```
GAGGTCCAGC TGGAACAGTC TGGACCTGAA GTGGTGAAGC

CTGGGACTTC AGTGAAGATA TCCTGCAAGA CTTCTGGATA

CACAATCACT GAACACACCT TGCACTGGAT AAAGCAGAAC

CAGGGAAAGA GCCTTGAGTG GATTGGTGGT ATTAATTTTG

ACAATGGTGG TACTACCTAC AGGCAGAAAT TCAAGGACAA

GGCCACATTG ACTGTGGACA AGTCCTCCAG CACAGCCTTC

ATGGAGCTCC GCAGCCTGAC TTCTGATGAT TCTGCAGTCT

ATTTCTGCGC AAGAAGGGCC TATTACTACG GTAGTGCCTT

TGACTACTGG GGCCAAGGCA CCACTCTCAC AGTCTCCTCA
```

Amino acid sequence of MAb 210 and chimeric anti-sEng antibody cENG10 variable domain of heavy chain ($V_H$) (without leader sequence)—SEQ ID NO:2. CDRs are indicated in bold.

```
EVQLEQSGPE VVKPGTSVKI SCKTSGYTIT EHTLHWIKQN

QGKSLEWIGG INFDNGGTTY RQKFKDKATL TVDKSSSTAF

MELRSLTSDD SAVYFCARRA YYYGSAFDYW GQGTTLTVSS
```

Nucleotide sequence of MAb 210 and chimeric anti-sEng antibody cENG10 variable domain of light chain ($V_L$) (without leader sequence)—SEQ ID NO:3.

```
GAAAATGTGC TCACCCAGTC TCCAGCAATC ATGTCTGCAT

CTCTAGGGGA GAAGGTCACC ATGACCTGCA GGGCCAGCTC

AAGTGTGAAT TACGTGTACT GGTACCAGCA GAAGTCAGAT

GCCTCCCCCA AACTATGGAT TTATTACACT TCCAACCTGG

CTCCTGGAGT CCCAGCTCGC TTCAGTGGCA GTGGGTCTGG

GAACTCTTAT TCTCTCACAA TCAGCAGCAT GGAGGGTGAA

GATGCTGCCA CTTATTACTG CCAGCAGTTT ATTAGTTTCC

CATACACGTT CGGAGGGGGG ACCAAGCTGG AAATAAAA
```

Amino acid sequence of MAb 210 and chimeric anti-sEng antibody cENG10 variable domain of heavy chain ($V_L$) (without leader sequence)—SEQ ID NO:4. CDRs are indicated in bold.

```
ENVLTQSPAI MSASLGEKVT MTCRASSSVN YVYWYQQKSD

ASPKLWIYYT SNLAPGVPAR FSGSGSGNSY SLTISSMEGE

DAATYYCQQF ISFPYTFGGG TKLEIK
```

TABLE 7

CDR sequences for mouse antibody MAb 210 and chimeric antibody cENG10

| CDR | Sequence | SEQ ID NO: |
| --- | --- | --- |
| CDR1H | GYTITEHTLH | 5 |
| CDR2H | GINFDNGGTTYRQKFKD | 6 |
| CDR3H | RAYYYGSAFDY | 7 |
| CDR1L | RASSSVNYVY | 8 |
| CDR2L | YTSNLAP | 9 |
| CDR3L | QQFISFPYT | 10 |

Chimerization of the MAb 210 Variable Regions with Human IgG1 Constant Domains, Generating Chimerized Antibody cENG10

The gene sequences of the lead antibody MAb210 variable regions ($V_H$ and $V_L$) were chimerized with gene sequences of the human IgG1 constant regions and subcloned into a mammalian expression vector to make the chimeric cENG10 antibody construct. To construct the chimeric heavy chain of cENG10, the gene sequences of MAb210 $V_H$ region was fused with gene sequences of human IgG1 $C_H1$ to $C_H3$ domains. The human IgG1 constant region contains an Asn300Gln (N300Q) mutation, which prevents N-glycosylation in the $C_H2$ domain. The DNA sequences of both the heavy chain (HC) and light chain (LC), as well as the N- and C-terminal junctions of the multi-cloning sites of the construct were verified by Sanger sequencing.

Nucleotide sequence of chimeric anti-sEng antibody cENG10 heavy chain SEQ ID NO:11. The leader sequence encoding the secretion signal peptide (19 amino acid residues, nucleotides 1-57) is underlined. The sequence encoding the variable chain ($V_H$) is indicated in bold (nucleotides 58-417). The human IgG $C_H1$-$C_H3$ portion of the heavy chain spans nucleotides 418-1404. The codon encoding the N300Q mutation is underlined, bold, and cursive.

Amino acid sequence of chimeric anti-sEng antibody cENG10 heavy chain SEQ ID NO:12. The variable chain ($V_H$) is indicated in bold (amino acids 1-120). The human IgG $C_H1$-$C_H3$ portion of the heavy chain spans amino acids 121-449. The N300Q mutation is underlined, bold, and cursive.

```
EVQLEQSGPE  VVKPGTSVKI  SCKTSGYTIT  EHTLHWIKQN

QGKSLEWIGG  INFDNGGTTY  RQKFKDKATL  TVDKSSSTAF

MELRSLTSDD  SAVYFCARRA  YYYGSAFDYW  GQGTTLTVSS

ASTKGPSVFP  LAPSSKSTSG  GTAALGCLVK  DYFPEPVTVS
```

```
ATGGGATGGT CATGTATCAT CCTTTTTCTA GTAGCAACTG CAACTGGAGT      100

ACATTCAGAG GTCCAGCTGG AACAGTCTGG ACCTGAAGTG GTGAAGCCTG

GGACTTCAGT GAAGATATCC TGCAAGACTT CTGGATACAC AATCACTGAA      200

CACACCTTGC ACTGGATAAA GCAGAACCAG GGAAAGAGCC TTGAGTGGAT

TGGTGGTATT AATTTTGACA ATGGTGGTAC TACCTACAGG CAGAAATTCA      300

AGGACAAGGC CACATTGACT GTGGACAAGT CCTCCAGCAC AGCCTTCATG

GAGCTCCGCA GCCTGACTTC TGATGATTCT GCAGTCTATT TCTGCGCAAG      400

AAGGGCCTAT TACTACGGTA GTGCCTTTGA CTACTGGGGC CAAGGCACCA

CTCTCACAGT CTCCTCAGCT AGCACCAAGG GCCCATCGGT CTTCCCCCTG      500

GCACCCTCCT CCAAGAGCAC CTCTGGGGGC ACAGCGGCCC TGGGCTGCCT

GGTCAAGGAC TACTTCCCCG AACCGGTGAC GGTGTCGTGG AACTCAGGCG      600

CCCTGACCAG CGGCGTGCAC ACCTTCCCGG CTGTCCTACA GTCCTCAGGA

CTCTACTCCC TCAGCAGCGT GGTGACCGTG CCCTCCAGCA GCTTGGGCAC      700

CCAGACCTAC ATCTGCAACG TGAATCACAA GCCCAGCAAC ACCAAGGTGG

ACAAGAGAGT TGAGCCCAAA TCTTGTGACA AAACTCACAC ATGCCCACCG      800

TGCCCAGCAC CTGAACTCCT GGGGGGACCG TCAGTCTTCC TCTTCCCCCC

AAAACCCAAG GACACCCTCA TGATCTCCCG GACCCCTGAG GTCACATGCG      900

TGGTGGTGGA CGTGAGCCAC GAAGACCCTG AGGTCAAGTT CAACTGGTAT

GTGGACGGCG TGGAGGTGCA TAATGCCAAG ACAAAGCCGC GGGAGGAGCA     1000

GTA**_CAA_**AAGC ACGTACCGTG TGGTCAGCGT CCTCACCGTC CTGCACCAAG

ACTGGCTGAA TGGCAAGGAG TACAAGTGCA AGGTCTCCAA CAAAGCCCTC     1100

CCAGCCCCCA TCGAGAAAAC CATCTCCAAA GCCAAAGGGC AGCCCCGAGA

ACCACAGGTG TACACCCTGC CCCCATCCCG GGAGGAGATG ACCAAGAACC     1200

AAGTCAGCCT GACCTGCCTG GTCAAAGGCT TCTATCCCAG CGACATCGCC

GTGGAGTGGG AGAGCAATGG GCAGCCGGAG AACAACTACA AGACCACGCC     1300

TCCCGTGCTG GACTCCGACG GCTCCTTCTT CCTCTATTCC AAGCTCACCG

TGGACAAGAG CAGGTGGCAG CAGGGGAACG TCTTCTCATG CTCCGTGATG     1400

CATGAGGCTC TGCACAACCA CTACACGCAG AAGAGCCTCT CCCTGTCTCC

GGGCTGA                                                    1407
```

```
WNSGALTSGV HTFPAVLQSS GLYSLSSVVT VPSSSLGTQT

YICNVNHKPS NTKVDKRVEP KSCDKTHTCP PCPAPELLGG

PSVFLFPPKP KDTLMISRTP EVTCVVVDVS HEDPEVKFNW

YVDGVEVHNA KTKPREEQYQ STYRVVSVLT VLHQDWLNGK

EYKCKVSNKA LPAPIEKTIS KAKGQPREPQ VYTLPPSREE

MTKNQVSLTC LVKGFYPSDI AVEWESNGQP ENNYKTTPPV

LDSDGSFFLY SKLTVDKSRW QQGNVFSCSV MHEALHNHYT

QKSLSLSPG
```

Nucleotide sequence of chimeric anti-sEng antibody cENG10 light chain SEQ ID NO:13. The leader sequence encoding the secretion signal peptide (19 amino acid residues, nucleotides 1-57) is underlined. The sequence encoding the variable chain ($V_L$) is indicated in bold (nucleotides 58-375). The human IgG kappa $C_L$ portion of the light chain spans nucleotides 376-696.

```
ATGGGATGGT CATGTATCAT CCTTTTTCTA GTAGCAACTG CAACTGGAGT   100

ACATTCAGAA AATGTGCTCA CCCAGTCTCC AGCAATCATG TCTGCATCTC

TAGGGGAGAA GGTCACCATG ACCTGCAGGG CCAGCTCAAG TGTGAATTAC   200

GTGTACTGGT ACCAGCAGAA GTCAGATGCC TCCCCCAAAC TATGGATTTA

TTACACTTCC AACCTGGCTC CTGGAGTCCC AGCTCGCTTC AGTGGCAGTG   300

GGTCTGGGAA CTCTTATTCT CTCACAATCA GCAGCATGGA GGGTGAAGAT

GCTGCCACTT ATTACTGCCA GCAGTTTATT AGTTTCCCAT ACACGTTCGG   400

AGGGGGGACC AAGCTGGAAA TAAAACGGAC TGTGGCTGCA CCATCTGTCT

TCATCTTCCC GCCATCTGAT GAGCAGTTGA AATCTGGAAC TGCCTCTGTT   500

GTGTGCCTGC TGAATAACTT CTATCCCAGA GAGGCCAAAG TACAGTGGAA

GGTGGATAAC GCCCTCCAAT CGGGTAACTC CCAGGAGAGT GTCACAGAGC   600

AGGACAGCAA GGACAGCACC TACAGCCTCA GCAGCACCCT GACGCTGAGC

AAAGCAGACT ACGAGAAACA CAAAGTCTAC GCCTGCGAAG TCACCCATCA   699

GGGCCTGAGC TCGCCCGTCA CAAAGAGCTT CAACAGGGGA GAGTGTTAG
```

Amino acid sequence of chimeric anti-sEng antibody cENG10 light chain SEQ ID NO:14. The variable chain ($V_L$) is indicated in bold (amino acids 1-106). The human IgG kappa CL portion of the light chain spans amino acids 107-213.

```
ENVLTQSPAI MSASLGEKVT MTCRASSSVN YVYWYQQKSD

ASPKLWIYYT SNLAPGVPAR FSGSGSGNSY SLTISSMEGE

DAATYYCQQF ISFPYTFGGG TKLEIKRTVA APSVFIFPPS

DEQLKSGTAS VVCLLNNFYP REAKVQWKVD NALQSGNSQE

SVTEQDSKDS TYSLSSTLTL SKADYEKHKV YACEVTHQGL

SSPVTKSFNR GEC
```

A summary of the relevant sequences for the mouse antibody MAb 210 and the chimeric antibody cENG10 is provided in Table 8.

TABLE 8

Summary of relevant sequences for the mouse antibody MAb 210 and the chimeric antibody cENG10

| SEQ ID NO: | Sequence | Type of sequence | Antibody |
|---|---|---|---|
| 1 | Variable domain of heavy chain | Nucleotide | MAb 210 and cENG10 |
| 2 | Variable domain of heavy chain | Amino acid | MAb 210 and cENG10 |
| 3 | Variable domain of light chain | Nucleotide | MAb 210 and cENG10 |
| 4 | Variable domain of light chain | Amino acid | MAb 210 and cENG10 |
| 11 | Heavy chain | Nucleotide | cENG10 |
| 12 | Heavy chain | Amino acid | cENG10 |
| 13 | Light chain | Nucleotide | cENG10 |
| 14 | Light chain | Amino acid | cENG10 |

Expression and Purification of HEK-293 Produced cENG10

Human embryonic kidney (HEK)-293F suspension-adapted cells were transiently transfected with polyethylenimine (PEI) and pIRES bicistronic expression vector DNA containing the cENG10 Heavy Chain (HC) gene under the control of Cytomegalovirus (CMV) immediate early (IE) promoter, followed by an encephalomycocarditis virus (ECMV) internal ribosome entry site (IRES) and the cENG10 Light Chain (LC) gene. The secreted cENG10 antibody in the conditioned media was purified by Protein-A affinity chromatography and Ion-Exchange Chromatography.

This experiment describes the generation of a chimeric antibody comprising the CDRs of murine antibody MAb 210, which exhibits a strong sEng-binding affinity combined with effective sEng depletion activity.

Example 8: Anti-sEng Antibody cENG10 Binds to its Target, sEng

The biological activity of cENG10 was assessed by analytical size exclusion chromatography (SEC) and ELISA.

Anti-sEng Antibody cENG10 Binds to sEng as Demonstrated by SEC

For the size exclusion chromatography, a Superdex 200 PC3.2/30 analytical column (GE Pharmacia) was pre-equilibrated in PBS (pH 7.4). 50 μl containing 1-2 μM concentrations of the antibody cENG10, sEng, and both antibody and sEng, respectively, were injected and eluted at flow rate of 0.050 ml/min. Absorbance curves were superimposed using identical scales.

Figure 4A:
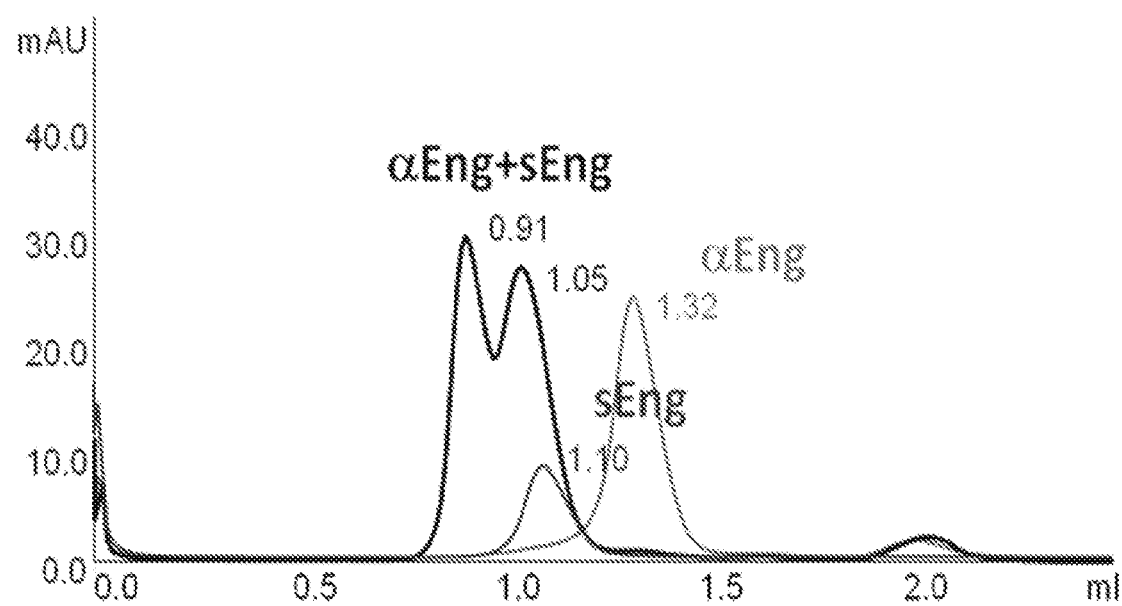
FIG. 4A-4B illustrates that anti-sEng antibody cENG10 binds to sEng, as demonstrated by size exclusion chromatography (SEC) (FIG. 4A) and ELISA (FIG. 4B).

FIG. 4A shows individual chromatograms of the anti-sEng antibody cENG10 (elution volume 1.32 ml), sEng (1.10 ml) and the antibody/sEng complex (elution volumes 0.91 ml and 1.05 ml), demonstrating that the antibody and sEng bind to each other and form larger molecular weight complexes (elution volumes 0.91 ml and 1.05 ml) when mixed at 1 to 2 molar concentrations. The two peaks observed for the antibody/sEng complex may be due to disulfide-bonded dimerization of sEng which would expose an additional epitope for multiple antibody binding.

Anti-sEng Antibody cENG10 Binds to sEng as Demonstrated by ELISA

For the ELISA, microplate wells were coated with 2 μg/ml sEng, blocked, and washed before serial dilutions of purified cENG10 were added. Bound anti-sEng antibody was detected by HRP-conjugated polyclonal antibodies against the Fc region of human IgG, followed by a colorimetric reaction.

Figure 4B:
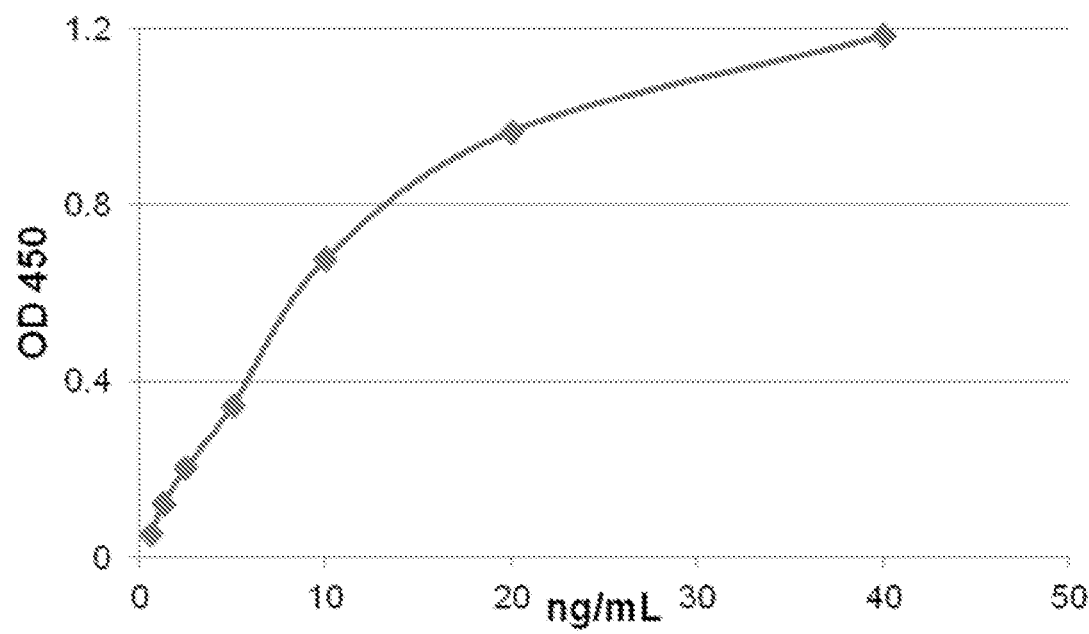

FIG. 4B shows dose-dependent binding of cENG10 to sEng by ELISA. Increasing amounts of anti-sEng antibody resulted in greater signals, demonstrating dose-dependence.

This experiment demonstrates that chimeric antibody cENG10 binds to sEng.

Anti-sEng Antibody cENG10 does not Block Binding of Endoglin to its Ligand Bmp9

For any column containing immobilized antibodies that deplete a patient's plasma of certain target proteins, there is a small chance that some of the antibody is released into the plasma and then introduced in the bloodstream of the patient. For the columns and systems described herein, this could potentially be dangerous, as the anti-sEng antibody could bind to Endoglin on the placenta. If the antibody were to block of Endoglin/ligand interactions while bound to the Engoglin on the placenta, this could have serious deleterious consequences for the patient or the fetus. As such, an antibody that does not disrupt Endoglin/ligand interactions is preferred.

To test whether or not antibody cENG10 blocks binding of sEng and its ligands was assessed using a sandwich ELISA. To that end, purified human Bmp9 and sEng were mixed at equimolar ratio in PBS (final total concentration 1 μM), incubated for 30 min and serially diluted (in 1% BSA) to 0.02 to 20 nM. Control solutions containing only Bmp9 or sEng were also prepared. Antibody cENG10 (4 μg/mL) was coated onto microplate wells. After a washing step, the wells were blocked with 1% BSA. Serial dilutions of either the preformed Bmp9-sEng complex, sEng alone, or Bmp9 alone were added and the plates incubated for 90 min. After another wash step, bound Bmp9 was detected using a biotinylated anti-Bmp9 antibody and a secondary, HRP-conjugated antibody, allowing for colorimetric detection of cENG10 binding to the Bmp9/sEng complex.

Figure 5:
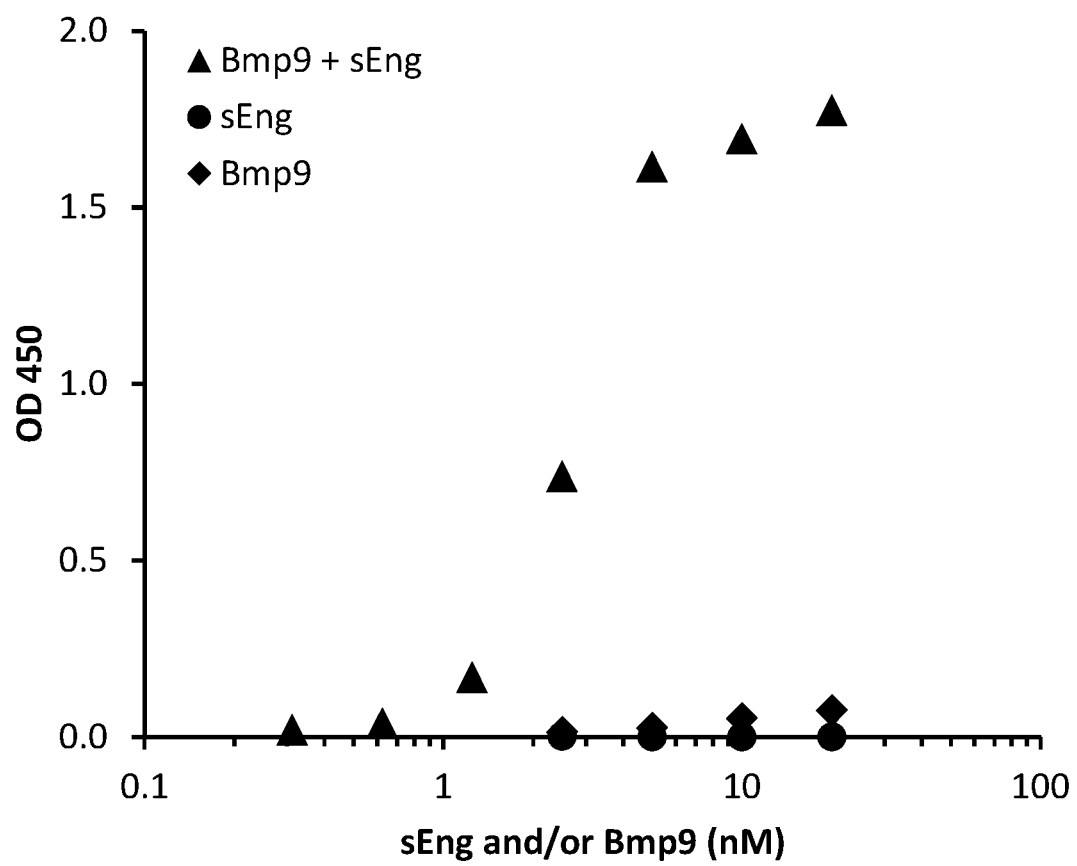
FIG. 5 illustrates that antibody cENG10 does not block binding of sEng to Endoglin ligand Bmp9. For the ELISA experiment shown, cENG10 antibody was coated onto microplates and incubated with the analyte (a preformed Bmp9/sEng complex, Bmp9 alone, or sEng alone). Bound Bmp9 was detected using a biotinylated anti-Bmp9 antibody and a secondary, HRP-conjugated antibody, allowing for colorimetric detection of cENG10 binding to the Bmp9/sEng complex.

As shown in FIG. 5, cENG10 captures the complex of Bmp9-sEng in a dose-dependent fashion, demonstrating that cENG10 is a non-ligand blocking antibody.

Example 9: Spiked sEng Depletion by cENG10 Device

The performance of cENG10 device columns at 1 ml scale was evaluated using a range of apheresis parameters to be used in clinical settings, including flow rates (volumetric and linear) and residence (contact) times.

Volumetric Flow Rate

Figure 6A:
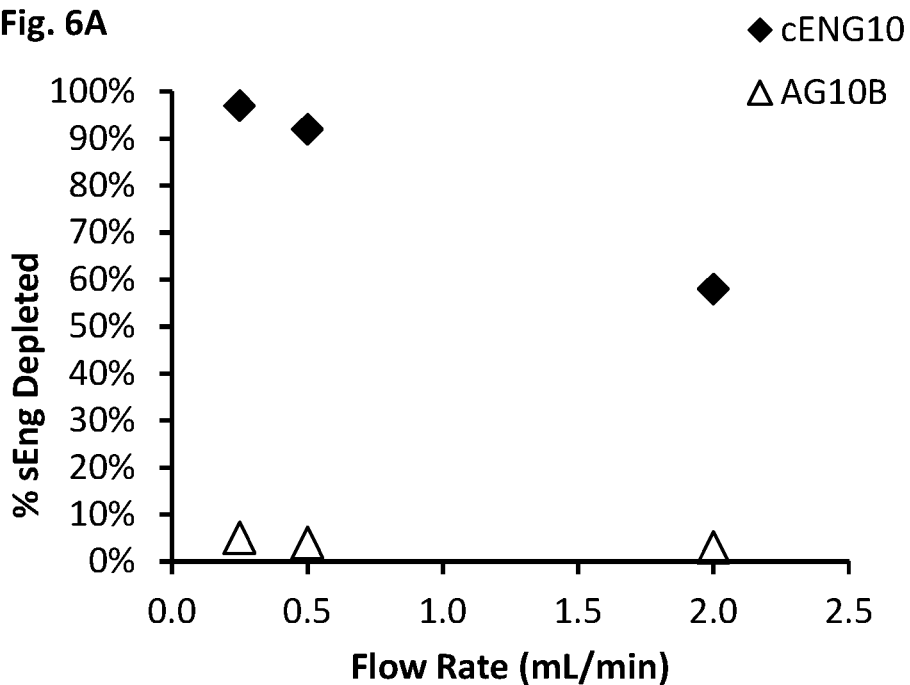
FIG. 6A-6B illustrates the effect of volumetric flow rate (FIG. 6A) and linear flow rate (FIG. 6B) on sEng depletion by antibody cENG10. Anti-sFlt-1 antibody AG10B served as a negative control.

The effect of the flow rate on sEng depletion by antibody cENG10 conjugated to Sepharose matrix at a ratio of 0.2 mg antibody per ml beads was determined (FIG. 6A). Anti-sFlt-1 antibody AG10B served as a negative control.

For each column, 0.2 mg cENG10 (anti-sEng) or AG10B (anti-sFlt-1) was covalently conjugated to 1 ml of CNBr-activated Sepharose 4FF beads for 0.2 mg antibody per ml beads ratio. For each test, 10 ml of serum containing 60 ng/ml of sEng, median concentration in severe pre-eclampsia patients, was applied for one cycle over the column. The first 1 ml containing pre-equilibration buffer was not collected in the flow-thru (FT) fraction and the last 1 ml of input remaining in column was chased with 1 CV of PBS buffer and pooled into the FT fraction. The % sEng depletion (or similarly for % sFlt-1 depletion) was calculated by dividing the difference in concentration between input and FT by input concentration:

$$([sEng]_{input} - [sEng]_{FT})/[sEng]_{input}$$

At 0.25 and 0.5 ml/min, 97% and 92% of the spiked sEng protein were depleted by the cENG10 column. At higher flow rate of 2 ml/min, sEng depletion decreased to ~60%. Of note, sEng depletion by the cENG10 device is specific for all flow rates tested, as the control AG10B device does not deplete any sEng from serum.

For clinical applications, the cENG10 may easily be scaled up. For instance, a 50 ml column with an antibody ratio of 0.2 mg antibody per ml beads or lower could process 25 ml plasma/min. At this rate, processing of a half body plasma volume (~2 L in pregnant women) would take ~80 min to complete treatment.

Linear Flow Rate

A 1-ml cENG10 device column covalently conjugated with 0.2 mg of either cENG10 (anti-sEng) or AG10B (anti-human sFlt-1) was tested for depletion of sEng spiked in horse serum. For input, 10 ml of serum containing 60 ng/ml of sEng was applied for one cycle over the column. The flow-thru fraction was collected as previously described. The % sEng depletion (or similarly for % sFlt-1 depletion) was calculated using the following formula:

$$([sEng]_{input} - [sEng]_{FT})/[sEng]_{input}$$

Figure 6B:
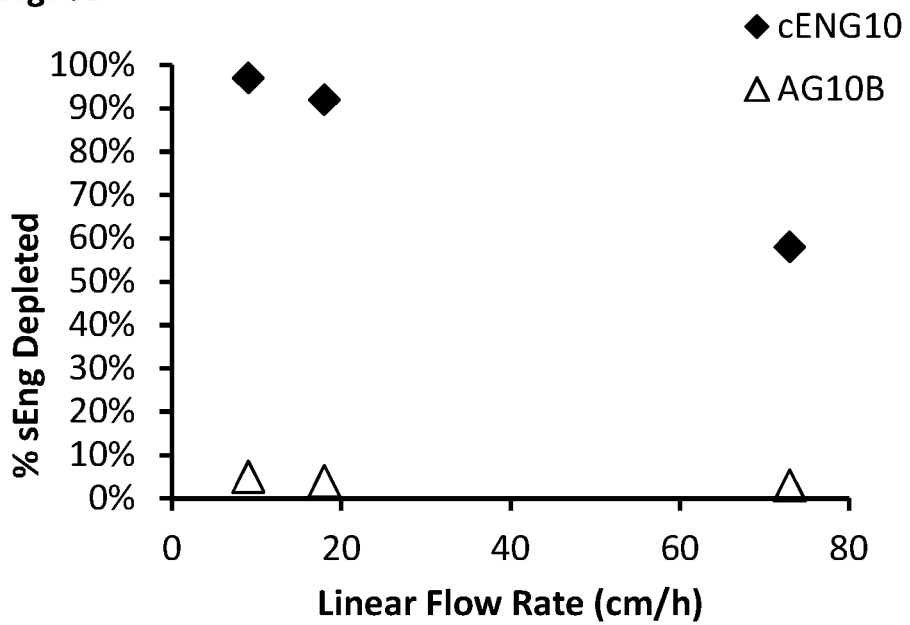

FIG. 6B takes the dimension of the packed column into consideration and shows the effect of linear flow rate on sEng depletion by the cENG10 column (ratio 0.2 mg antibody per ml beads) at 1 ml scale. Under these conditions, depletion of sEng was particularly effective at linear flow rates<18 cm/hour (or <0.3 cm/min). Again, sEng depletion by the cENG10 device is specific for all flow rates tested, as the control AG10B device did not deplete any sEng from serum.

Residence Time

The residence (or column contact) time is an important parameter to consider in this mode of affinity-mediated apheresis treatment because this affects the percent of antigen removed per volume processed; increased residence time results in increased antigen removal.

A 1-ml cENG10 device column covalently conjugated with 0.2 mg of either cENG10 (anti-human sEng) or AG10B (anti-human sFlt-1) MAb was tested for depletion of sEng spiked in horse serum and the flow-thru fraction was collected as described above. The % sEng depletion (or similarly for % sFlt-1 depletion) was calculated ([sEng]input−[sEng]FT)/[sEng] input.

Figure 7A:
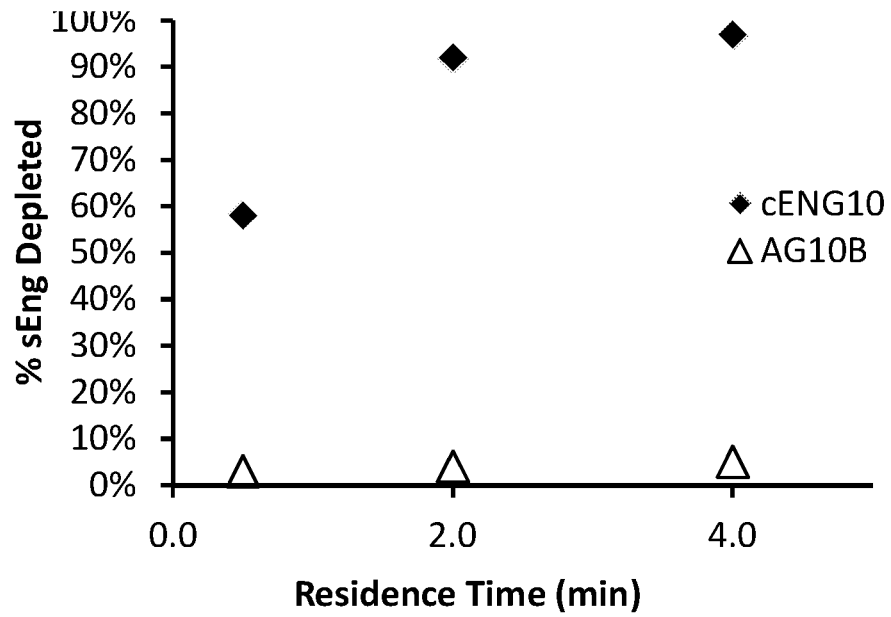
FIG. 7A-7B illustrates the effect of residence time (FIG. 7A) and antibody to bead ratio (FIG. 7B) on sEng depletion by antibody cENG10. Anti-sFlt-1 antibody AG10B served as a negative control.

At 1 ml scale, residence time of 2 min or greater leads to particularly effective (>90%) sEng depletion (FIG. 7A). The control AG10B did not deplete sEng even at all residence times tested up to 4 min.

Antibody to Bead Ratio

Different antibody to bead ratios were tested for depletion of sEng in human plasma using a 1 ml cENG10 device column covalently conjugated with varying amounts of cENG10 (anti-human sEng) or 1 mg of AG10B (anti-human sFlt1). The % sEng depletion (or similarly for % sFlt-1 depletion) was calculated according to the following formula:

$$([sEng]_{input} - [sEng]_{FT})/[sEng]_{input}$$

Figure 7B:
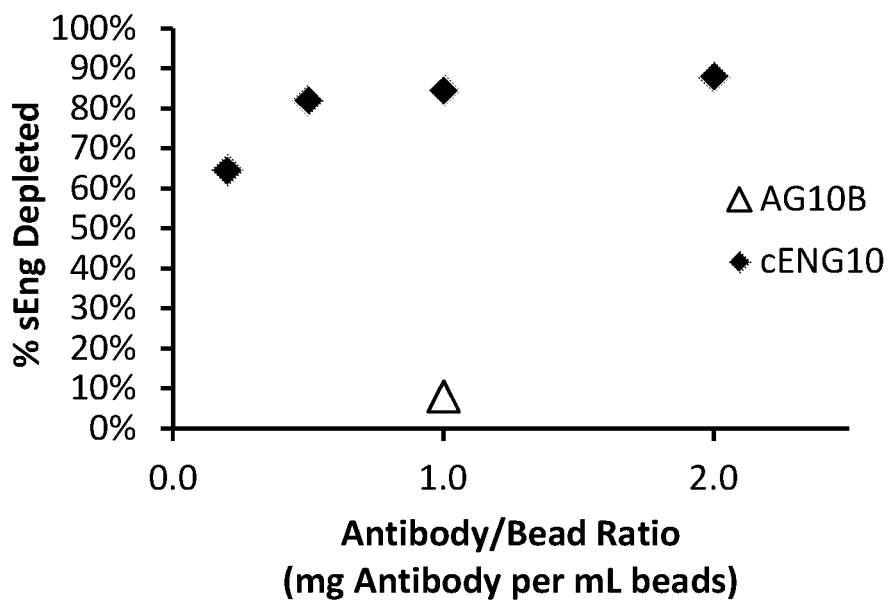

At an antibody to bead ratio of >0.5 mg of cENG10 antibody per ml beads, >80% of sEng spiked into human plasma were depleted (FIG. 7B).

This experiment demonstrates that the systems of the invention are useful for the effective depletion of sEng from biological fluids under a variety of conditions.

Example 10: Endogenous sEng Depletion from Patient Serum by cENG10

It has been suggested that the endogenous sEng protein elevated in pre-eclampsia patients constitutes full ectodomain and/or fragments cleaved from sEng or the membrane-bound Endoglin receptors. As such, the ability of the cENG10 device to remove these endogenous sEng protein variants from patient serum was determined.

0.1-ml cENG10 (conjugated with CHO-derived cENG10), control AG10B or mock-conjugated device columns were tested for depletion of endogenous sEng from pooled serum of pre-eclampsia patients. An antibody to bead ratio of 1 mg/ml beads was used.

The cENG10 column effectively removes >90% of endogenous sEng (see Table 9). Further, the column is specific, as it does not remove the endogenous sFlt-1. Conversely, the control AG10B column (conjugated with anti-sFlt-1 antibody) does not remove endogenous sEng but effectively removes its target sFlt-1. As expected, the additional control mock-conjugated (−) beads column did not remove either of the endogenous targets. An experiment using device column made with HEK-293F derived cENG10 antibody coupled at 0.8 mg/ml beads density showed comparable results (data not shown).

This experiment demonstrates that the methods, systems, and compositions provided herein are useful for removing endogenous sEng protein variants from patient serum.

TABLE 9

Endogenous sEng depletion from patient serum

| Antibody | Antibody target | % sEng depleted | % sFlt-1 depleted |
|---|---|---|---|
| cENG10 (CHO-derived) | sEng | 96% | 3% |
| AG10B | sFlt-1 | −3% | 95% |
| Beads (−) | | 0% | 0% |

---

What is claimed is:

1. An anti-sEng antibody or sEng-binding fragment thereof, the anti-sEng antibody or sEng-binding fragment comprising a heavy chain variable region and a light chain variable region, wherein each of the heavy chain and the light chain variable regions comprises a CDR1, CDR2, and CDR3, and wherein:
the sequence of CDR1H comprises SEQ ID NO:5;
the sequence of CDR2H comprises SEQ ID NO:6;
the sequence of CDR3H comprises SEQ ID NO:7;
the sequence of CDR1L comprises SEQ ID NO:8;
the sequence of CDR2L comprises SEQ ID NO:9; and
the sequence of CDR3L comprises SEQ ID NO:10.

2. The anti-sEng antibody or sEng-binding fragment thereof of claim 1, wherein:
(a) the heavy chain variable region comprises SEQ ID NO:2 or a sequence at least 85% identical thereto; and
(b) the light chain variable region comprises SEQ ID NO:4 or a sequence at least 85% identical thereto.

3. The anti-sEng antibody or sEng-binding fragment thereof of claim 1, wherein the anti-sEng antibody or sEng-binding fragment thereof
(a) has a heavy chain comprising SEQ ID NO: 12 or a sequence at least 85% identical thereto; and
(b) has a light chain comprising SEQ ID NO:14 or a sequence at least 85% identical thereto.

4. The anti-sEng antibody or sEng-binding fragment thereof of claim 1, wherein the heavy chain variable region comprises SEQ ID NO:2 and wherein the light chain variable region comprises SEQ ID NO:4.

5. The anti-sEng antibody or sEng-binding fragment thereof of claim 1, wherein the anti-sEng antibody or sEng-binding fragment thereof has a heavy chain comprising SEQ ID NO:12 and wherein the anti-sEng antibody or sEng-binding fragment thereof has a light chain comprising SEQ ID NO: 14.

6. A nucleic acid encoding the anti-sEng antibody or sEng-binding fragment thereof of claim 1.

7. The nucleic acid of claim 6, wherein the nucleic acid comprises SEQ ID NO: 1 or SEQ ID NO:3.

8. A vector comprising the nucleic acid of claim 6.

9. An isolated cell comprising the vector of claim 8.

10. A method of treating a pregnancy-related hypertensive disorder in a subject in need thereof, the method comprising providing ex vivo to the subject the anti-sEng antibody or sEng-binding fragment thereof of claim 1, wherein the pregnancy-related hypertensive disorder is eclampsia, pre-eclampsia, or HELLP syndrome.

11. The method of claim 10, wherein the subject is a pregnant human or a postpartum human.

12. The method of claim 10, the method comprising:
(a) removing blood from the subject,
(b) passing the blood or a component thereof over a solid support to which are attached anti-sEng antibodies or sEng-binding fragments thereof, to decrease the level of sEng in the blood or component thereof, and
(c) returning the blood or component thereof to the subject's body.

13. The method of claim 12, wherein the blood or a component thereof comprises plasma and the method comprises removing a volume of the subject's blood and separating the blood into plasma and cellular components and passing the plasma over the solid support.

14. A system comprising:
(a) the anti-sEng antibodies or sEng-binding fragments thereof of claim 1, wherein the anti-sEng antibodies or sEng-binding fragments thereof are attached to a solid support;
(b) a first means for conveying blood or a component thereof from a subject to the anti-sEng antibodies or sEng-binding fragments thereof bound to the solid support so as to contact the blood or a component thereof with the anti-sEng antibodies or sEng-binding fragments thereof and thereby to remove sEng from the blood or a component thereof, wherein the first means comprises:
(i) an access device, inserted into a blood vessel of the subject, for accessing the subject's blood system; and
(ii) a conduit system, which fluidly connects the access device to the anti-sEng antibodies, or sEng-binding fragments thereof, bound to the solid support, thereby allowing the subject's blood or a component thereof to flow to and contact the anti-sEng antibodies, or sEng-binding fragments thereof, and
(c) a second means for conveying the blood or a component thereof to the subject following contact of the blood or a component thereof with the anti-sEng antibodies or sEng-binding fragments thereof, wherein the second means comprises:
(i) a conduit system; and
ii) a return device, where the return device is inserted into a blood vessel of the subject, and where the conduit system fluidly connects the blood or a component thereof in contact with the anti-sEng antibodies, or sEng-binding fragments thereof, to the return device so as to allow for the return of the blood or a component thereof to the subject.

15. The system of claim 14, wherein the first means comprises a device for separating the subject's blood into plasma and cellular components.

16. The system of claim 15, wherein the device for separating the subject's blood into plasma and cellular components is a centrifuge or an apheresis device.

17. A column containing anti-sEng antibodies or sEng-binding fragments thereof of claim 1, wherein the anti-sEng antibodies or sEng-binding fragments thereof are attached to a solid support.

* * * * *